(12) United States Patent
Jung et al.

(10) Patent No.: US 12,028,721 B2
(45) Date of Patent: Jul. 2, 2024

(54) MEASUREMENT METHOD AND APPARATUS USING MULTIPLE FREQUENCY PARTIAL BAND IN WIRELESS COMMUNICATION SYSTEM

(71) Applicant: Samsung Electronics Co., Ltd., Suwon-si (KR)

(72) Inventors: Byounghoon Jung, Suwon-si (KR); Anil Agiwal, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 17/309,621

(22) PCT Filed: Dec. 12, 2019

(86) PCT No.: PCT/KR2019/017558
§ 371 (c)(1),
(2) Date: Jun. 10, 2021

(87) PCT Pub. No.: WO2020/122621
PCT Pub. Date: Jun. 18, 2020

(65) Prior Publication Data
US 2021/0385669 A1 Dec. 9, 2021

(30) Foreign Application Priority Data

Dec. 12, 2018 (KR) .................. 10-2018-0160345

(51) Int. Cl.
*H04W 24/10* (2009.01)
*H04W 16/28* (2009.01)
*H04W 72/044* (2023.01)
*H04W 72/542* (2023.01)

(52) U.S. Cl.
CPC ........... *H04W 16/28* (2013.01); *H04W 24/10* (2013.01); *H04W 72/046* (2013.01); *H04W 72/542* (2023.01)

(58) Field of Classification Search
CPC ... H04W 16/28; H04W 24/10; H04W 72/046; H04W 72/542; H04B 7/0632; H04B 7/0695; H04B 17/24; H04B 17/382
See application file for complete search history.

(56) References Cited

U.S. PATENT DOCUMENTS 10,270,514 B2 4/2019 Moon et al.
2017/0324459 A1 11/2017 Koskela et al.
(Continued)

FOREIGN PATENT DOCUMENTS

KR 10-2017-0085426 A 7/2017
KR 20170085426 A * 7/2017
(Continued)

OTHER PUBLICATIONS

3rd Generation Partnership Project; Technical Specification Group Radio Access Network; NR; NR and NG-RAN Overall Description; Stage 2, 3GPP TS 38.300 V15.3.1 (Oct. 2018) (Year: 2018).*
(Continued)

*Primary Examiner* — Shailendra Kumar

(57) ABSTRACT

Provided are a measurement method and apparatus using a multiple frequency partial band in a wireless communication system, and an operation method of a terminal for measuring quality of a cell in a wireless communication system, may include: receiving a plurality of beams including a reference signal, the plurality of beams transmitted by using one of a first bandwidth part (BWP) and a second BWP from a base station of the cell; determining a first beam quality measurement value representing quality of plurality of beams transmitted by using the first BWP; determining a second beam quality measurement value representing quality of
(Continued)

plurality of beams transmitted by using the second BWP; and determining a cell quality measurement value indicating the quality of the cell, based on the first beam quality measurement value and the second beam quality measurement value.

16 Claims, 26 Drawing Sheets

(56) References Cited

U.S. PATENT DOCUMENTS

2018/0338253 A1    11/2018  Nagaraja et al.
2020/0266870 A1*   8/2020  Yoon .................... H04B 17/318

FOREIGN PATENT DOCUMENTS

WO       2018144873 A1    8/2018
WO       2018185726 A1   10/2018

OTHER PUBLICATIONS

International Search Report and Written Opinion of the International Searching Authority dated Mar. 30, 2020 in connection with International Application No. PCT/KR2019/017558, 10 pages.
3GPP TS 38.300 V15.3.1 (Oct. 2018), Technical Specification, 3rd Generation Partnership Project; Technical Specification Group Radio Access Network; NR; NR and NG-RAN Overall Description; Stage 2 (Release 15), Oct. 2018, 92 pages.

* cited by examiner

MEASUREMENT METHOD AND APPARATUS USING MULTIPLE FREQUENCY PARTIAL BAND IN WIRELESS COMMUNICATION SYSTEM

CROSS-REFERENCE TO RELATED APPLICATIONS

This application is a 371 National Stage of International Application No. PCT/KR2019/017558, filed Dec. 12, 2019, which claims priority to Korean Patent Application No. 10-2018-0160345, filed Dec. 12, 2018, the disclosures of which are herein incorporated by reference in their entirety.

BACKGROUND

1. Field

The present disclosure relates to a method and apparatus for measuring the quality of an adjacent cell by using multiple frequency partial bands in a wireless communication system.

2. Description of Related Art

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why 5G communication systems or pre-5G communication systems are called beyond 4G network communication systems or post long-term evolution (LTE) systems. In order to achieve a high data rate, 5G communication systems are being developed to be implemented in a super-high frequency band (millimeter wave (mmWave)), e.g., a band of 60 GHz. In order to reduce a path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud radio access network (RAN) as a big data processing technology described above may be an example of convergence of 5G technology and IoT technology.

In order to achieve a high data rate considered in the present specification, 5G communication systems are being developed to be implemented in a super-high frequency band (millimeter wave (mmWave)), e.g., a band of 60 GHz. In order to reduce a path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas.

In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation.

Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

SUMMARY

The present disclosure relates to a method and apparatus for measuring, by a terminal, the quality of an adjacent cell by performing transmission/reception of data and a reference signal by using a multiple frequency partial band, in a system including one or more base stations and one or more terminals.

The present disclosure relates to a measurement method and apparatus using a multiple frequency partial band in a wireless communication system, and an operation method of a terminal for measuring quality of a cell in a wireless communication system, according to an embodiment, may include: receiving a plurality of beams including a reference signal, the plurality of beams transmitted by using one of a first bandwidth part (BWP) and a second BWP from a base station of the cell; determining a first beam quality measurement value representing quality of a plurality of beams transmitted by using the first BWP, based on quality measurement values according to the reference signal of each of the plurality of beams transmitted by using the first BWP; determining a second beam quality measurement value representing quality of a plurality of beams transmitted by using the second BWP, based on quality measurement values according to the reference signal of each of the plurality of beams transmitted by using the second BWP; and determining a cell quality measurement value indicating the quality of the cell, based on the first beam quality measurement value and the second beam quality measurement value.

A terminal for measuring quality of a cell, in the wireless communication system, according to an embodiment of the present disclosure, may include: a transceiver; and at least one processor connected to the transceiver and configured to: receive a plurality of beams including a reference signal, the plurality of beams transmitted by using one of a first bandwidth part (BWP) and a second BWP from a base station of the cell; determine a first beam quality measurement value representing quality of the plurality of beams transmitted by using the first BWP, based on quality measurement values according to the reference signal of each of the plurality of beams transmitted by using the first BWP; determine a second beam quality measurement value representing quality of the plurality of beams transmitted by using the second BWP, based on quality measurement values according to the reference signal of each of the plurality of beams transmitted by using the second BWP; and determine a cell quality measurement value indicating the quality of the cell, based on the first beam quality measurement value and the second beam quality measurement value.

DETAILED DESCRIPTION

Figure 1:
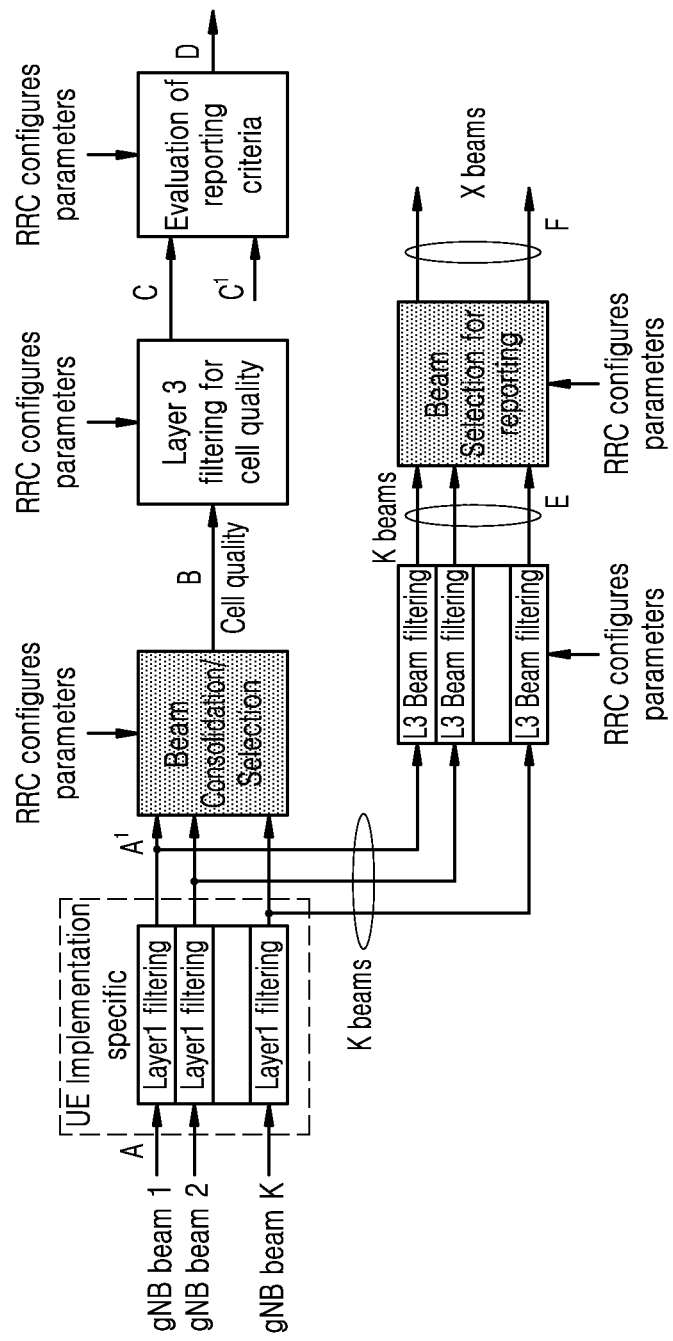
FIG. 1 is a diagram showing a measurement model for a terminal to derive the quality of any cell, and a measurement model for deriving and reporting a beam measurement value to be reported.

Hereinafter, embodiments of the present disclosure will be described with reference to accompanying drawings. While describing the present disclosure, detailed description of related well-known functions or configurations may be omitted when it is deemed that they may unnecessarily obscure the essence of the present disclosure. Also, terms used below are defined in consideration of functions in the present disclosure, and may have different meanings according to an intention of a user or operator, customs, or the like. Thus, the terms should be defined based on the description throughout the specification.

Advantages and features of one or more embodiments of the present disclosure and methods of accomplishing the same may be understood more readily by reference to the following detailed description of the embodiments of the present disclosure and the accompanying drawings. In this regard, the embodiments of the present disclosure may have different forms and should not be construed as being limited to the descriptions set forth herein. Rather, these embodiments of the present disclosure are provided so that the present disclosure will be thorough and complete and will fully convey the concept of the present disclosure to one of ordinary skill in the art, and the present disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the present embodiments means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

While describing the present disclosure, detailed description of related well-known functions or configurations may be omitted when it is deemed that they may unnecessarily obscure the essence of the present disclosure. Hereinafter, embodiments of the present disclosure will be described with reference to accompanying drawings.

Also, terms for identifying access nodes, terms denoting network entities, terms denoting messages, terms denoting interfaces between network entities, terms denoting various types of identification information, etc. used herein are exemplified for convenience of description. Thus, the terms used in the present disclosure are not limited and other terms denoting targets having the same technical meanings may be used.

Hereinafter, for convenience of description, the present disclosure uses terms and names defined by the 3rd generation partnership project long term evolution (3GPP LTE) standard. However, the present disclosure is not limited by such terms and names, and may be equally applied to systems conforming to other standards. In the present disclosure, an evolved node B (eNB) will be used interchangeably with a next generation node B (gNB) for convenience of description. In other words, a base station described as an eNB may also indicate a gNB. Also, the term 'terminal' may indicate not only mobile phones, narrow band-Internet of things (NB-IoT) devices, and sensors, but also other wireless communication devices.

Hereinafter, a base station is an entity that assigns resources of a terminal, and may be at least one of a next generation node B (gNB), an evolved node B (eNB), a node B (NB), a base station (BS), a wireless access unit, a base station controller, or a node on a network. Examples of a terminal may include user equipment (UE), a mobile station (MS), a cellular phone, a smartphone, a computer, and a multimedia system capable of performing a communication function. However, the present disclosure is not limited to the above examples.

In particular, the present disclosure may be applied to 3GPP new radio (NR) (5th generation (5G) mobile communication standard). Also, the present disclosure may be applied to intelligent services (e.g., smart homes, smart buildings, smart cities, smart cars or connected cars, health care, digital education, retail business, and security and safety related services) based on 5G communication technology and IoT related technology. In the present disclosure, an evolved node B (eNB) will be used interchangeably with a next generation node B (gNB) for convenience of description. In other words, a base station described as an eNB may also indicate a gNB. Also, the term 'terminal' may indicate not only mobile phones, narrow band-Internet of things (NB-IoT) devices, and sensors, but also other wireless communication devices.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a UE or an MS) transmits data or a control signal to a base station (e.g., eNB), and the DL refers to a radio link through which a base station transmits data or a control signal to a terminal. The multiple access scheme as described above normally allocates and operates time-frequency resources including data or control information to be transmitted to each other to prevent the time-frequency resources from overlapping with each other, that is, establish orthogonality, thereby identifying the data or the control information of each user.

As a future communication system after the LTE system, that is, a 5G communication system, has to be able to freely reflect various requirements of a user and a service provider, and thus, services satisfying various requirements at the same time need to be supported. The services considered for the 5G communication system include enhanced mobile broadband (eMBB), massive machine type communication (mMTC), ultra-reliability low latency communication (hereinafter, URLLC), etc.

According to some embodiments, the eMBB aims to provide a higher data transfer rate than a data transfer rate supported by the LTE, LTE-A, or LTE-Pro system. For example, in the 5G communication system, the eMBB should be able to provide a peak data rate of 20 Gbps in a downlink and a peak data rate of 10 Gbps in an uplink from the viewpoint of one base station. In addition, the 5G communication system should provide the increased user perceived data rate of the terminal simultaneously with providing the peak data rate. In order to satisfy such requirements, improvement of various transmitting/receiving technologies including a further improved multiple-input and multiple-output (MIMO) transmission technology may be demanded in the 5G communication system. In addition, signals are transmitted using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data rate required in the 5G communication system.

At the same time, the mMTC is being considered to support application services such as IoT in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and various devices to provide communication functions. In addition, the terminals supporting the mMTC are more likely to be positioned in shaded areas not covered by a cell, such as the underground of a building due to nature of services, and thus, the terminal requires a wider coverage than other services provided by the 5G communication system. The terminals that support the mMTC should be configured as inexpensive terminals and require very long battery lifetime, such as 10 to 15 years, because it is difficult to frequently replace batteries of the terminals.

Finally, the URLLC that is a cellular-based wireless communication service used for mission-critical purposes may be used, for example, in remote control for robots or machinery, industrial automation, unmanaged aerial vehicles, remote health care, or emergency alert. Accordingly, communication provided by the URLLC should provide very low latency (ultra-low latency) and very high reliability (ultra-high reliability). For example, a service supporting the URLLC should satisfy air interface latency smaller than 0.5 milliseconds and at the same time, may have a requirement of a packet error rate of $10^{-5}$ or less. Accordingly, for URLLC-supportive services, the 5G system may be required to provide a transmit time interval (TTI) shorter than those for other services while securing reliable communication links by allocating a broad resource in a frequency band.

The three services, that is, eMBB, URLLC, and mMTC, considered in the above 5G communication system may be multiplexed in one system and may be transmitted. In this case, the services may use different transmission and reception methods and transmission and reception parameters in order to meet their different requirements. However, the mMTC, URLLC, and eMBB are examples of different service types, and service types to which the present disclosure is applied are not limited thereto.

Also, although embodiments of the present disclosure are described by using the LTE, LTE-A, LTE Pro, or 5G (or NR) system, the embodiments of the present disclosure may be applied to other communication systems having a similar technical background or channel type. Also, it will be understood by one of ordinary skill in the art that embodiments of the present disclosure may be applied to other communication systems through some modifications without departing from the scope of the present disclosure.

The present disclosure relates to a next-generation wireless communication system, and designs a system, method, and apparatus for a terminal to use a multiple frequency partial bandwidth to transmit/receive data in a licensed band or a non-licensed band, in a system including at least one base station and at least one terminal.

FIG. 1 is a diagram showing a measurement model for a terminal to derive the quality of any cell, and a measurement model for deriving and reporting a beam measurement value to be reported.

A network may configure, to the terminal, parameters for deriving measurement results, such as reference signal received power (RSRP), reference signal received quality (RSRQ), a signal-to-noise ratio (SINR), and a channel quality indicator (CQI), per cell representing each cell. For example, the network may configure, to the terminal, a maximum number of beams for obtaining an average, a beam consolidation threshold value, a reference signal type, and the like. Also, the network may configure, to the terminal, parameters for deriving measurement results, such as RSRP, RSRQ, SINR, and CQI, per bandwidth part (BWP) representing each BWP in any cell. For example, the network may configure, to the terminal, the maximum number of beams for obtaining the average, the beam consolidation threshold value, the reference signal type, and the like.

Referring to FIG. 1, the terminal may receive reference signals transmitted by a specific base station (gNB), for example, synchronization signal blocks (SSBs) or channel state information reference signals (CSI-RSs), and distinguish transmission beams of different base stations by referring to SSB index (ID) or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and measure the quality of a cell to which the synchronization signals belong, from the measured qualities of beams.

Referring to FIG. 1, the terminal may perform layer 1 (L1) filtering on synchronization signals, such as SSBs or CSI-RSs having a same ID, indicating the base station beams that are periodically received, for example, the base station beams distinguishable by the terminal.

Thereafter, the terminal may derive one cell quality measurement value via beam selection and consolidation processes regarding the plurality of beams so as to derive a single measurement value for determining the quality of the cell. During the beam selection and consolidation processes, the terminal may derive a single cell quality measurement value by comparing and selecting the beams via a following method.

1. A method of selecting a beam measurement value having a best measurement value.
2. A method of selecting a beam measurement value having a best measurement value from among beam measurement values having a value equal to or greater than a certain threshold value configured via any downlink signal (a radio resource control (RRC) signal, a media access control (MAC) signal, or a physical layer (PHY) signal). Here, when there is no beam measurement value having a value equal to or greater than the certain threshold value, the terminal may determine that a corresponding cell is not suitable for an access.
3. A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding cell is not suitable for an access.

To derive a cell quality measurement value, when the required parameters, for example, the maximum number of beams for obtaining the average, the beam consolidation threshold value, and the reference signal type, are not entirely or partially configured, the terminal may not perform such derivation, but may simply derive a cell value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

Next, the terminal performs L3 filtering on the single cell quality value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, when the cell quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may report a measurement value to the base station.

Referring to FIG. 1, when a measurement report is configured to include a report of an individual beam value, the terminal may perform processes of deriving a measurement value for each beam and selecting a report value, for the measurement report of a beam value.

In this regard, the terminal may derive an averaged measurement value for each beam by performing L3 filtering on measurement values for each beam, on which L1 filtering has been performed. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, for a measurement report of beam quality, the terminal may perform a beam selecting process according to a method and procedure configured by the base station via a downlink signal (an RRC signal, an MAC signal, or a PHY signal). During the beam selecting process, the terminal may derive beam measurement values to be reported to the base station by comparing and selecting the beams via a following method.

1. A method of selecting a beam measurement value having a best measurement value.
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a measurement value equal to or greater than the specific threshold value, the terminal may not include any measurement value of a beam to a report.
3. A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the specific threshold value, the terminal may not include any measurement value of a beam to a report.

To derive the beam measurement value, when the required parameters, for example, the maximum number of beams, the beam consolidation threshold value, and the reference signal type, are not entirely or partially configured, the terminal may not perform such derivation, but may simply report a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams is configured. Also, the terminal may perform a second operation when only the beam consolidation threshold value is configured. Also, the terminal may perform a fourth operation when both the maximum number of beams and the beam consolidation threshold value are configured. Also, the terminal may perform a first operation when nothing is configured.

Figure 2A:
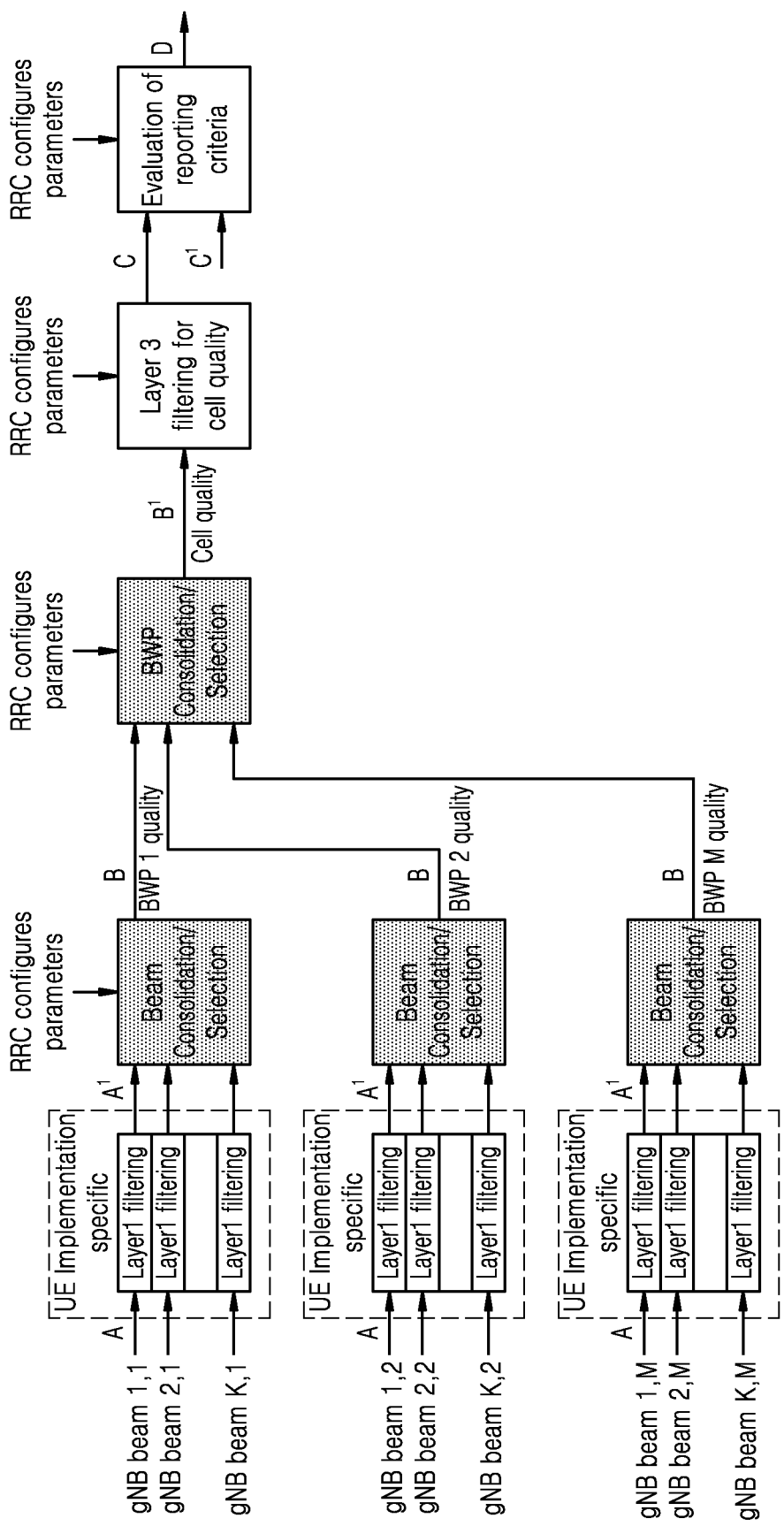
FIG. 2A is a diagram showing a measurement model for a terminal to derive and report the quality of any cell.

FIG. 2A is a diagram showing a measurement model for a terminal to derive and report the quality of any cell.

A network may configure, to the terminal, parameters for deriving measurement results, such as RSRP, RSRQ, SINR, and CQI per cell representing each cell. For example, the network may configure, to the terminal, a maximum number of beams for obtaining an average, a beam consolidation threshold value, a reference signal type, and the like. Also, the network may configure, to the terminal, parameters for deriving measurement results, such as RSRP, RSRQ, SINR, and CQI per BWP representing each BWP in any cell. For example, the network may configure, to the terminal, the maximum number of beams for obtaining the average, the beam consolidation threshold value, the reference signal type, and the like.

Referring to FIG. 2A, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.
1. When a base station transmits an explicit BWP ID when transmitting a reference signal
  A. When the BWP ID is included in an equation for generating a reference signal ID
  B. When the BWP ID is included in a signal that is simultaneously or continuously transmitted with the reference signal
2. When a base station pre-configured, to a terminal, BWPs corresponding to reference signals by using an RRC signal, an MAC signal, or the like
3. When a correlation between a BWP ID and a reference ID has been defined according to an implicit rule pre-determined between a base station and a terminal Referring to FIG. 2A, the terminal performs L1 filtering on synchronization signals, such as SSBs or CSI-RSs having a same ID, indicating the base station beams that are periodically received, for example, the base station beams distinguishable by the terminal.

Thereafter, the terminal may derive one BWP quality measurement value via beam selection and consolidation processes regarding a plurality of beams included in each BWP, so as to derive a single measurement value for determining the quality of each BWP. During the beam selection and consolidation processes, the terminal may derive a single BWP quality measurement value by comparing and selecting the beams via a following method.

1. A method of selecting a beam measurement value having a best measurement value.
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding BWP is not suitable to be used.
3. A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding BWP is not suitable to be used.

To derive a BWP quality measurement value, when the required parameters, for example, the maximum number of beams for obtaining the average, the beam consolidation threshold value, and the reference signal type, are not entirely or partially configured, the terminal may not perform such derivation, but may simply derive a BWP value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

The parameters for deriving the BWP quality measurement value may configure common values to be commonly used in all BWPs in the cell or may configure different values for each BWP.

Thereafter, the terminal derives one cell quality measurement value via BWP selecting and merging processes regarding the plurality of BWPs so as to derive a single measurement value for determining the quality of the cell. During the BWP selecting and merging processes, the terminal may derive a single cell quality measurement value by comparing and selecting the BWPs via a following method.
1. A method of selecting a BWP measurement value having a best measurement value.
2. A method of selecting a BWP measurement value having a best measurement value from among BWP measurement values having a value equal to or greater than a specific threshold value configured by the base station via any downlink signal (an RRC signal, an MAC signal, or a PHY signal). Here, when there is no BWP measurement value having a value equal to or greater than the certain threshold value, the terminal may determine that a corresponding cell is not suitable for an access.
3. A method of obtaining an average by sequentially selecting N' BWP measurement values having good measurement values from a BWP having a best measurement value.
4. A method of selecting BWP measurement values having a value equal to or greater than a certain threshold value configured via any downlink signal (an RRC signal, an MAC signal, or a PHY signal), and sequentially selecting N' BWP measurement values having good measurement values from a BWP having a best measurement value among the selected BWP measurement values and obtaining an average thereof. Here, a method of, when the number of BWPs equal to or greater than the certain threshold value is less than N', only selecting these BWPs and obtaining the average. Here, when there is no BWP equal to or greater than the certain threshold value, the terminal may determine that a corresponding cell is not suitable for an access.

To derive a cell quality measurement value, when required parameters, for example, a maximum number of BWPs for obtaining the average, a BWP consolidation threshold value, and the reference signal type, are not entirely or partially configured, the terminal may not perform such derivation, but may simply derive a cell value with a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs for obtaining the average is configured. Also, the terminal may perform a second operation when only the BWP consolidation threshold value is configured. Also, the terminal may perform a fourth operation when both the maximum number of BWPs for obtaining the average and the BWP consolidation threshold value are configured. Also, the terminal may perform a first operation when nothing is configured.

Next, the terminal performs L3 filtering on the single cell quality value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, when the cell quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may report a measurement value to the base station.

By using the method of deriving measurement values of BWPs by measuring, selecting, and classifying beams measured for each BWP shown in FIG. 2A, the terminal may be able to measure and infer channel quality for each BWP obtainable when data is actually transmitted/received by using a BWP, and determine a BWP currently exhibiting a best performance. Also, by primarily deriving the measurement values for such BWPs and secondarily deriving a cell measurement quality value by using the measurement values, the terminal may be able to infer an obtainable channel quality characteristic while selecting and changing BWPs from the corresponding cell. Accordingly, further effective and accurate cell measurement value may be derived when the terminal transmits/receives data by using one or a few BWPs, in a system capable of transmitting/receiving data by using only one or a few BWPs instantaneously. Also, such a measurement model enables a performance actually available to the terminal to be further efficiently inferred in a system for assigning and changing a resource in units of BWPs instead of beams.

Figure 2B:
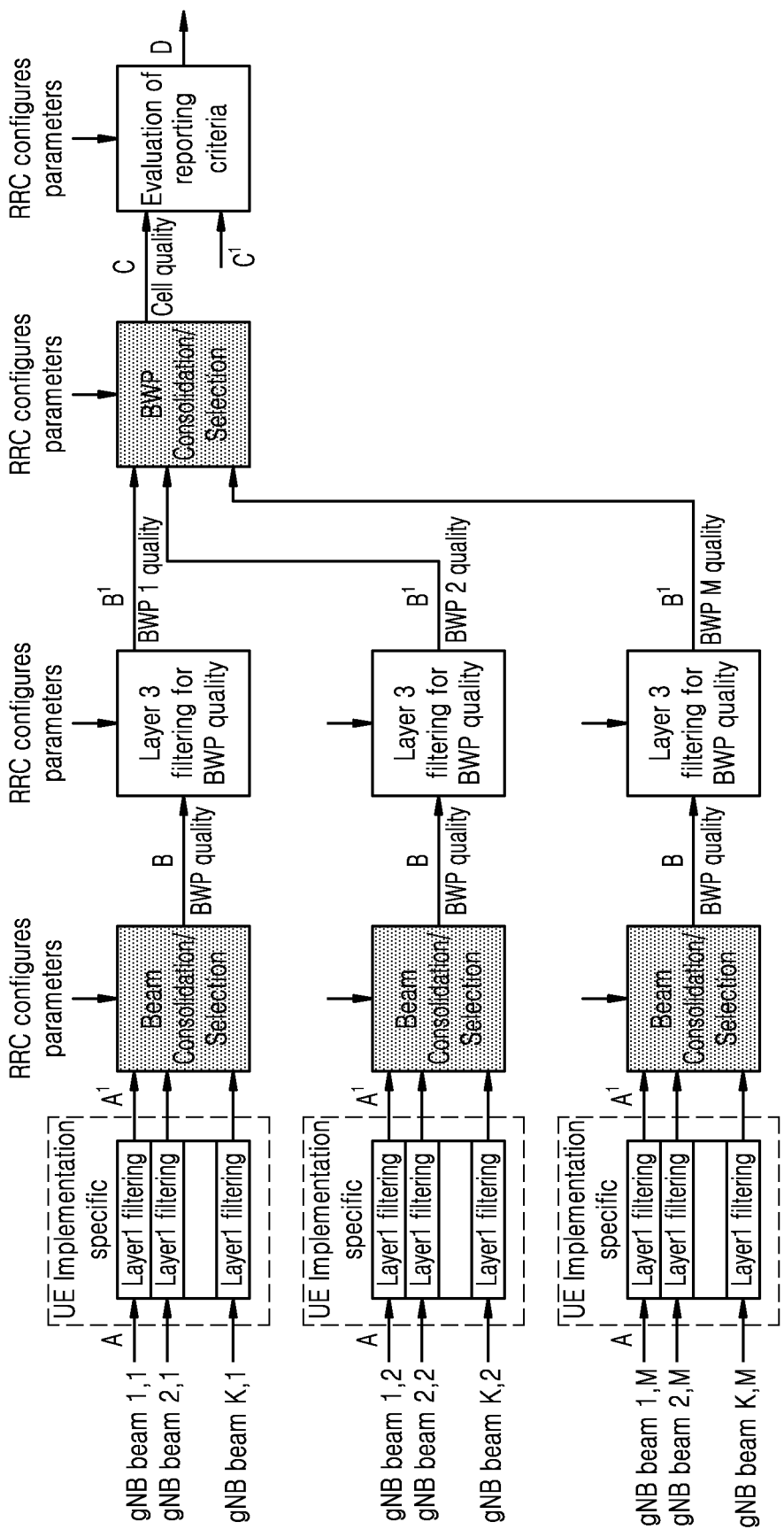
FIG. 2B is a diagram showing a measurement model for a terminal to derive and report the quality of any cell.

FIG. 2B is a diagram showing a measurement model for a terminal to derive and report the quality of any cell.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIG. 2B, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.
1. When a base station transmits an explicit BWP ID when transmitting a reference signal
  A. When the BWP ID is included in an equation for generating a reference signal ID
  B. When the BWP ID is included in a signal that is simultaneously or continuously transmitted with the reference signal
2. When a base station pre-configured, to a terminal, BWPs corresponding to reference signals by using an RRC signal, an MAC signal, or the like
3. When a correlation between a BWP ID and a reference ID has been defined according to an implicit rule pre-determined between a base station and a terminal Referring to FIG. 2B, the terminal performs L1 filtering on synchronization signals, such as SSBs or CSI-RSs having a same ID, indicating the base station beams that are periodically received, for example, the base station beams distinguishable by the terminal.

Thereafter, the terminal may derive one BWP quality measurement value via beam selection and consolidation processes regarding a plurality of beams included in each BWP, so as to derive a single measurement value for determining the quality of each BWP. During the beam selection and consolidation processes, the terminal may derive a single BWP quality measurement value by comparing and selecting the beams via a following method.

1. A method of selecting a beam measurement value having a best measurement value
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding BWP is not suitable to be used.
3. A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding BWP is not suitable to be used.

To derive a BWP quality measurement value, when the required parameters, for example, the maximum number of beams for obtaining the average, the beam consolidation threshold value, and the reference signal type, are not entirely or partially configured, the terminal may not perform such derivation, but may simply derive a BWP value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

The parameters for deriving the BWP quality measurement value may configure common values to be commonly used in all BWPs in the cell or may configure different values for each BWP. Next, the terminal performs L3 filtering on the single BWP quality value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Thereafter, the terminal derives one cell quality measurement value via BWP selecting and merging processes regarding the plurality of BWPs so as to derive a single measurement value for determining the quality of the cell. During the BWP selecting and merging processes, the terminal may derive a single cell quality measurement value by comparing and selecting the BWPs via a following method.

1. A method of selecting a BWP measurement value having a best measurement value.
2. A method of selecting a BWP measurement value having a best measurement value from among BWP measurement values having a value equal to or greater than a specific threshold value configured by the base station via any downlink signal (an RRC signal, an MAC signal, or a PHY signal). Here, when there is no BWP measurement value having a value equal to or greater than the certain threshold value, the terminal may determine that a corresponding cell is not suitable for an access.
3. A method of obtaining an average by sequentially selecting N' BWP measurement values having good measurement values from a BWP having a best measurement value.
4. A method of selecting BWP measurement values having a value equal to or greater than a certain threshold value configured via any downlink signal (an RRC signal, an MAC signal, or a PHY signal), and sequentially selecting N' BWP measurement values having good measurement values from a BWP having a best measurement value among the selected BWP measurement values and obtaining an average thereof. Here, a method of, when the number of BWPs equal to or greater than the certain threshold value is less than N', only selecting these BWPs and obtaining the average. Here, when there is no BWP equal to or greater than the certain threshold value, the terminal may determine that a corresponding cell is not suitable for an access.

To derive a cell quality measurement value, when the required parameters, for example, a maximum number of BWPs for obtaining the average, a BWP consolidation threshold value, and the reference signal type, are not entirely or partially configured, the terminal may not perform such derivation, but may simply derive a cell value with a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs for obtaining the average is configured. Also, the terminal may perform a second operation when only the BWP consolidation threshold value is configured. Also, the terminal may perform a fourth operation when both the maximum number of BWPs for obtaining the average and the BWP consolidation threshold value are configured. Also, the terminal may perform a first operation when nothing is configured.

Then, when the cell quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may report a measurement value to the base station.

Figure 3A:
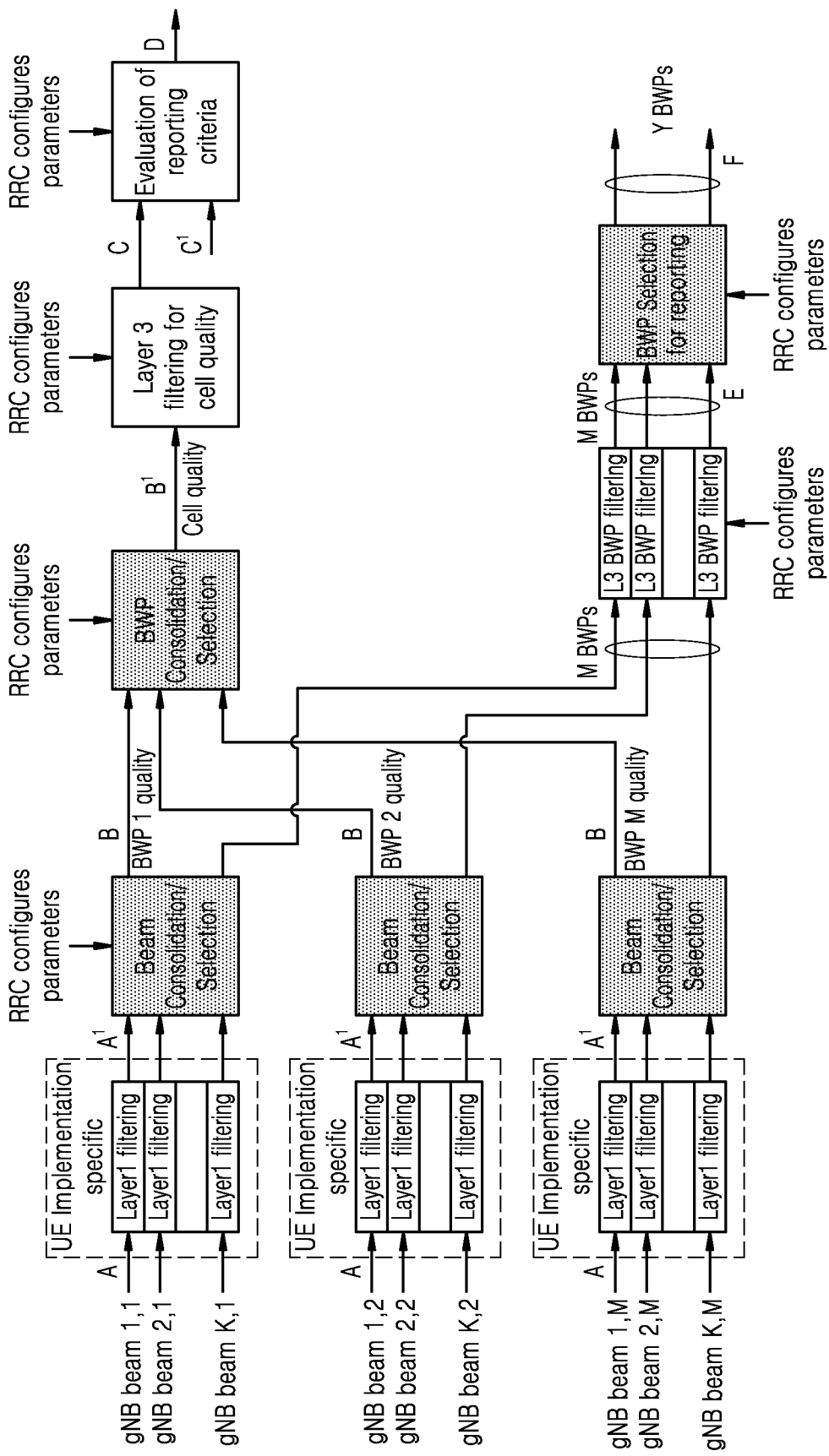
FIG. 3A is a diagram showing a measurement model for a terminal to derive and report the quality of any cell, and a measurement model for deriving and reporting a bandwidth part (BWP) measurement value to be reported.

FIG. 3A is a diagram showing a measurement model for a terminal to derive and report the quality of any cell, and a measurement model for deriving and reporting a BWP measurement value to be reported.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIG. 3A, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.
1. When a base station transmits an explicit BWP ID when transmitting a reference signal
  A. When the BWP ID is included in an equation for generating a reference signal ID
  B. When the BWP ID is included in a signal that is simultaneously or continuously transmitted with the reference signal
2. When a base station pre-configured, to a terminal, BWPs corresponding to reference signals by using an RRC signal, an MAC signal, or the like
3. When a correlation between a BWP ID and a reference ID has been defined according to an implicit rule pre-determined between a base station and a terminal Referring to FIG. 3A, the terminal performs L1 filtering on synchronization signals, such as SSBs or CSI-RSs having a same ID, indicating the base station beams that are periodically received, for example, the base station beams distinguishable by the terminal.

Thereafter, the terminal may derive one BWP quality measurement value via beam selection and consolidation processes regarding a plurality of beams included in each BWP, so as to derive a single measurement value for determining the quality of each BWP. During the beam selection and consolidation processes, the terminal may derive a single BWP quality measurement value by comparing and selecting the beams via a following method.
1. A method of selecting a beam measurement value having a best measurement value
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding BWP is not suitable to be used.
3. A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding BWP is not suitable to be used.

To derive a BWP quality measurement value, when the required parameters, for example, the maximum number of beams for obtaining the average, the beam consolidation threshold value, and the reference signal type, are not entirely or partially configured, the terminal may not perform such derivation, but may simply derive a BWP value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

Thereafter, the terminal derives one cell quality measurement value via BWP selecting and merging processes regarding the plurality of BWPs so as to derive a single measurement value for determining the quality of the cell. During the BWP selecting and merging processes, the terminal may derive a single cell quality measurement value by comparing and selecting the BWPs via a following method.
1. A method of selecting a BWP measurement value having a best measurement value.
2. A method of selecting a BWP measurement value having a best measurement value from among BWP measurement values having a value equal to or greater than a specific threshold value configured by the base station via any downlink signal (an RRC signal, an MAC signal, or a PHY signal). Here, when there is no BWP measurement value having a value equal to or greater than the certain threshold value, the terminal may determine that a corresponding cell is not suitable for an access.

3. A method of obtaining an average by sequentially selecting N' BWP measurement values having good measurement values from a BWP having a best measurement value.
4. A method of selecting BWP measurement values having a value equal to or greater than a certain threshold value configured via any downlink signal (an RRC signal, an MAC signal, or a PHY signal), and sequentially selecting N' BWP measurement values having good measurement values from a BWP having a best measurement value among the selected BWP measurement values and obtaining an average thereof. Here, a method of, when the number of BWPs equal to or greater than the certain threshold value is less than N', only selecting these BWPs and obtaining the average. Here, when there is no BWP equal to or greater than the certain threshold value, the terminal may determine that a corresponding cell is not suitable for an access.

To derive a cell quality measurement value, when required parameters, for example, a maximum number of BWPs for obtaining the average, a BWP consolidation threshold value, and the reference signal type, are not entirely or partially configured, the terminal may not perform such derivation, but may simply derive a cell value with a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs for obtaining the average is configured. Also, the terminal may perform a second operation when only the BWP consolidation threshold value is configured. Also, the terminal may perform a fourth operation when both the maximum number of BWPs for obtaining the average and the BWP consolidation threshold value are configured. Also, the terminal may perform a first operation when nothing is configured.

Next, the terminal performs L3 filtering on the single cell quality value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, when the cell quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may report a measurement value to the base station.

Referring to FIG. 3A, when a measurement report is configured to include a report of an individual BWP value, the terminal may perform processes of deriving a measurement value for each BWP and selecting a report value, for the measurement report of a BWP value.

In this regard, the base station may transmit, to the terminal, a specific indicator indicating a result of measuring the BWP value to be included in a measurement report, for example, a periodic measurement report or a measurement report caused by an event triggered by a cell value, by including the specific indicator in a signal. Alternatively, by using parameters used to select and organize the result of measuring the BWP value, when at least one or all of the parameters configured, the BWP measurement results may be included in the measurement report, for example, the periodic measurement report or the measurement report caused by the event triggered by the cell value, or when none of the parameters are configured, the BWP measurement results may not be included.

In this regard, the terminal may derive an averaged measurement value for each BWP by performing L3 filtering on measurement values for each BWP, on which L1 filtering has been performed. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, for a measurement report of BWP quality, the terminal may perform a BWP selecting process according to a method and procedure configured by the base station via a downlink signal (an RRC signal, an MAC signal, or a PHY signal). During the BWP selecting process, the terminal may derive BWP measurement values to be reported to the base station by comparing and selecting the BWPs via a following method.

1. A method of selecting and reporting a BWP measurement value having a best measurement value.
2. A method of selecting a BWP measurement value having a best measurement value from among BWP measurement values having a value equal to or greater than a specific threshold value configured by the base station via any downlink signal (an RRC signal, an MAC signal, or a PHY signal). Here, when there is no BWP measurement value having a measurement value equal to or greater than the specific threshold value, the terminal may not include any measurement value of a BWP to a report.
3. A method of obtaining an average by sequentially selecting N BWP measurement values having good measurement values from a BWP having a best measurement value.
4. A method of selecting BWP measurement values having a value equal to or greater than a certain threshold value configured via any downlink signal (an RRC signal, an MAC signal, or a PHY signal), and sequentially selecting N BWP measurement values having good measurement values from a BWP having a best measurement value among the selected BWP measurement values and reporting the same. Here, a method of, when the number of BWPs equal to or greater than the certain threshold value is less than N, only selecting and reporting these BWPs. Here, when there is no BWP equal to or greater than the specific threshold value, the terminal may not include any measurement value of a BWP to a report.

To derive the BWP to be reported, when the required parameters, for example, the maximum number of BWPs, the BWP consolidation threshold value, and the reference signal type, are not entirely or partially configured, the terminal may not perform such derivation, but may simply report a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs is configured. Also, the terminal may perform a second operation when only the BWP consolidation threshold value is configured. Also, the terminal may perform a fourth operation when both the maximum number of BWPs and the BWP consolidation threshold value are configured. Also, the terminal may perform a first operation when nothing is configured.

Figure 3B:
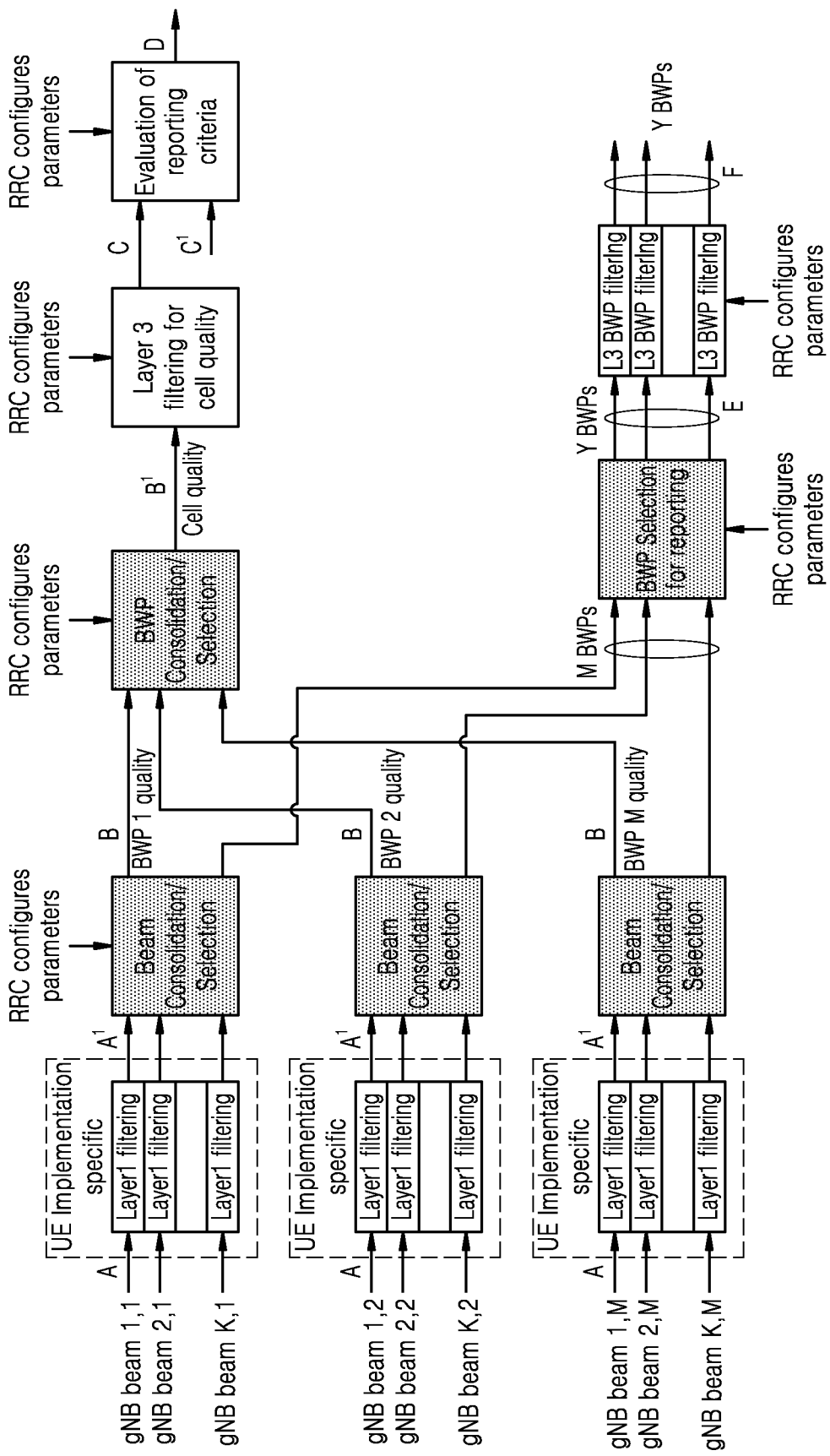
FIG. 3B is a diagram showing a measurement model for a terminal to derive and report the quality of any cell, and a measurement model for deriving and reporting a BWP measurement value to be reported.

By using the method of measuring, selecting and classifying beams measured for each BWP, and including measurement values of BWPs to a report shown in FIGS. 3A and 3B, the terminal may be able to measure channel quality for each BWP obtainable when data is actually transmitted/received by using a BWP, and provide corresponding information to the base station. The base station may use such measurement information of a BWP for various purposes, for example, BWP reconfiguration, BWP change, BWP addition, BWP removal, and the like. Accordingly, further effective information may be transmitted to the base station when the terminal transmits/receives data by using one or a few BWPs, in a system capable of transmitting/receiving data by using only one or a few BWPs instantaneously. Also, such a measurement model enables a performance actually available to the terminal to be further efficiently inferred in a system for assigning and changing a resource in units of BWPs instead of beams.

The method of performing the BWP selecting process according to the method and procedure configured by the base station via any downlink signal (an RRC signal, an MAC signal, or a PHY signal) for a measurement report of BWP quality, shown in FIGS. 3A and 3B, is not limited to the embodiments of FIGS. 3A and 3B, and may be used by being added to other drawings for deriving the quality for each BWP.

FIG. 3B is a diagram showing a measurement model for a terminal to derive and report the quality of any cell, and a measurement model for deriving and reporting a BWP measurement value to be reported.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIG. 3B, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.
 1. When a base station transmits an explicit BWP ID when transmitting a reference signal
   A. When the BWP ID is included in an equation for generating a reference signal ID
   B. When the BWP ID is included in a signal that is simultaneously or continuously transmitted with the reference signal
 2. When a base station pre-configured, to a terminal, BWPs corresponding to reference signals by using an RRC signal, an MAC signal, or the like
 3. When a correlation between a BWP ID and a reference ID has been defined according to an implicit rule pre-determined between a base station and a terminal Referring to FIG. 3B, the terminal performs L1 filtering on synchronization signals, such as SSBs or CSI-RSs having a same ID, indicating the base station beams that are periodically received, for example, the base station beams distinguishable by the terminal.

Thereafter, the terminal may derive one BWP quality measurement value via beam selection and consolidation processes regarding a plurality of beams included in each BWP, so as to derive a single measurement value for determining the quality of each BWP. During the beam selection and consolidation processes, the terminal may derive a single BWP quality measurement value by comparing and selecting the beams via a following method.
 1. A method of selecting a beam measurement value having a best measurement value
 2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding BWP is not suitable to be used.
 3. A method of obtaining an average by sequentially selecting N beam measurement values having good measurement values from a beam having a best measurement value.
 4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding BWP is not suitable to be used.

To derive a BWP quality measurement value, when the required parameters, for example, the maximum number of beams for obtaining the average, the beam consolidation threshold value, and the reference signal type, are not entirely or partially configured, the terminal may not perform such derivation, but may simply derive a BWP value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

Thereafter, the terminal derives one cell quality measurement value via BWP selecting and merging processes regarding the plurality of BWPs so as to derive a single measurement value for determining the quality of the cell. During the BWP selecting and merging processes, the terminal may derive a single cell quality measurement value by comparing and selecting the BWPs via a following method.
1. A method of selecting a BWP measurement value having a best measurement value.
2. A method of selecting a BWP measurement value having a best measurement value from among BWP measurement values having a value equal to or greater than a specific threshold value configured by the base station via any downlink signal (an RRC signal, an MAC signal, or a PHY signal). Here, when there is no BWP measurement value having a value equal to or greater than the certain threshold value, the terminal may determine that a corresponding cell is not suitable for an access.
3. A method of obtaining an average by sequentially selecting N' BWP measurement values having good measurement values from a BWP having a best measurement value.
4. A method of selecting BWP measurement values having a value equal to or greater than a certain threshold value configured via any downlink signal (an RRC signal, an MAC signal, or a PHY signal), and sequentially selecting N' BWP measurement values having good measurement values from a BWP having a best measurement value among the selected BWP measurement values and obtaining an average thereof. Here, a method of, when the number of BWPs equal to or greater than the certain threshold value is less than N', only selecting these BWPs and obtaining the average. Here, when there is no BWP equal to or greater than the certain threshold value, the terminal may determine that a corresponding cell is not suitable for an access.

To derive a cell quality measurement value, when required parameters, for example, a maximum number of BWPs for obtaining the average, a BWP consolidation threshold value, and the reference signal type, are not entirely or partially configured, the terminal may not perform such derivation, but may simply derive a cell value with a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs for obtaining the average is configured. Also, the terminal may perform a second operation when only the BWP consolidation threshold value is configured. Also, the terminal may perform a fourth operation when both the maximum number of BWPs for obtaining the average and the BWP consolidation threshold value are configured. Also, the terminal may perform a first operation when nothing is configured.

Next, the terminal performs L3 filtering on the single cell quality value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, when the cell quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may report a measurement value to the base station.

Referring to FIG. 3B, when a measurement report is configured to include a report of an individual BWP value, the terminal may perform processes of deriving a measurement value for each BWP and selecting a report value, for the measurement report of a BWP value.

In this regard, the base station may transmit, to the terminal, a specific indicator indicating a result of measuring the BWP value to be included in a measurement report, for example, a periodic measurement report or a measurement report caused by an event triggered by a cell value, by including the specific indicator in a signal. Alternatively, by using parameters used to select and organize the result of measuring the BWP value, when at least one or all of the parameters configured, the BWP measurement results may be included in the measurement report, for example, the periodic measurement report or the measurement report caused by the event triggered by the cell value, or when none of the parameters are configured, the BWP measurement results may not be included.

Then, for a measurement report of BWP quality, the terminal may perform a BWP selecting process according to a method and procedure configured by the base station via a downlink signal (an RRC signal, an MAC signal, or a PHY signal). During the BWP selecting process, the terminal may derive BWP measurement values to be reported to the base station by comparing and selecting the BWPs via a following method.
1. A method of selecting and reporting a BWP measurement value having a best measurement value.
2. A method of selecting a BWP measurement value having a best measurement value from among BWP measurement values having a value equal to or greater than a specific threshold value configured by the base station via any downlink signal (an RRC signal, an MAC signal, or a PHY signal). Here, when there is no BWP measurement value having a measurement value equal to or greater than the specific threshold value, the terminal may not include any measurement value of a BWP to a report.
3. A method of obtaining an average by sequentially selecting N BWP measurement values having good measurement values from a BWP having a best measurement value.
4. A method of selecting BWP measurement values having a value equal to or greater than a certain threshold value configured via any downlink signal (an RRC signal, an MAC signal, or a PHY signal), and sequentially selecting N BWP measurement values having good measurement values from a BWP having a best measurement value among the selected BWP measurement values and reporting the same. Here, a method of, when the number of BWPs equal to or greater than the certain threshold value is less than N, only selecting and reporting these BWPs. Here, when there is no BWP equal to or greater than the specific threshold value, the terminal may not include any measurement value of a BWP to a report.

To derive the BWP to be reported, when the required parameters, for example, the maximum number of BWPs, the BWP consolidation threshold value, and the reference signal type, are not entirely or partially configured, the terminal may not perform such derivation, but may simply report a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs is configured. Also, the terminal may perform a second operation when only the BWP consolidation threshold value is configured. Also, the terminal may perform a fourth operation when both the maximum number of BWPs and the BWP consolidation threshold value are configured. Also, the terminal may perform a first operation when nothing is configured.

Next, the terminal may derive an averaged measurement value for each BWP via L3 filtering for selected measurement values for each BWP. For the L3 filtering, the base station may configure, to the terminal, a specific weight factor via any downlink signal (an RRC signal, an MAC signal, or a PHY signal), and the terminal may perform the L3 filtering by using the configured specific weight factor.

In FIGS. 3A and 3B, an example of performing L3 filtering after deriving a cell quality measurement value by performing BWP selection and merging is illustrated, but an order of such BWP selecting and merging processes and a process of performing L3 filtering of a cell measurement value may be changed.

Figure 4A:
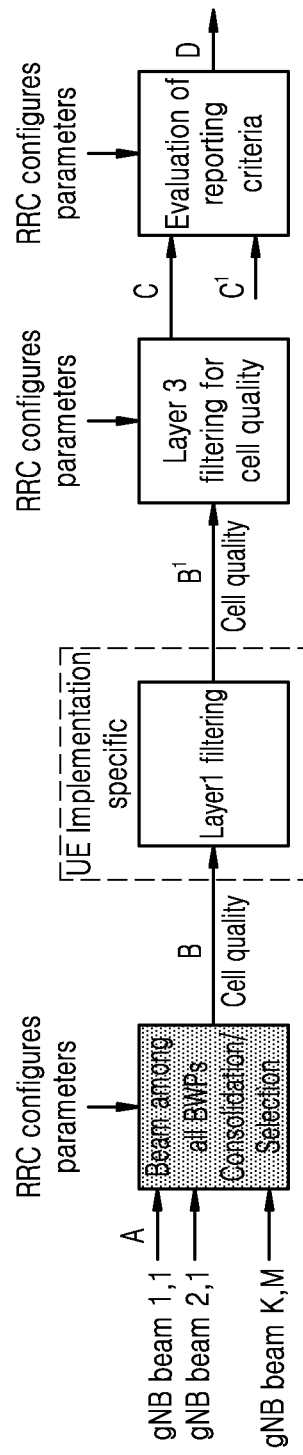
FIG. 4A is a diagram showing a measurement model in a multiple beam multiple BWP environment for a terminal to derive the quality of any cell.

FIG. 4A is a diagram showing a measurement model in a multiple beam multiple BWP environment for a terminal to derive the quality of any cell.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIG. 4A, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.
1. When a base station transmits an explicit BWP ID when transmitting a reference signal
   A. When the BWP ID is included in an equation for generating a reference signal ID
   B. When the BWP ID is included in a signal that is simultaneously or continuously transmitted with the reference signal
2. When a base station pre-configured, to a terminal, BWPs corresponding to reference signals by using an RRC signal, an MAC signal, or the like
3. When a correlation between a BWP ID and a reference ID has been defined according to an implicit rule pre-determined between a base station and a terminal Referring to FIG. 4A, the terminal derives one cell quality measurement value via BWP selecting and merging processes regarding a plurality of beams included in the plurality of BWPs so as to derive a single measurement value for determining the quality of the cell. During the beam selection and consolidation processes, the terminal may derive a single cell quality measurement value by comparing and selecting the beams via a following method.
1. A method of selecting a beam measurement value having a best measurement value
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding cell is not suitable for an access.
3. A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding cell is not suitable for an access.

To derive a cell quality measurement value, when the required parameters, for example, the maximum number of beams for obtaining the average, the beam consolidation threshold value, and the reference signal type, are not entirely or partially configured, the terminal may not perform such derivation, but may simply derive a cell value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

Next, the terminal performs L1 filtering on the single cell quality value.

Next, the terminal performs L3 filtering on the single cell quality value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, when the cell quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may report a measurement value to the base station.

By using a method of driving a cell value by measuring, selecting, and classifying all beams in a cell shown in FIG. 4A, the terminal may report, to the base station, cell quality obtainable when data is transmitted/received by using an actually best available beam regardless of a BWP. Here, the terminal may transmit further valid information to the base station when the data is transmitted/received by using one or a few beams regardless of a BWP, in a flexible system capable of transmitting/receiving data by instantaneously using optimum beams among many available beams in a plurality of BWPs. Also, such a measurement model enables the terminal to further efficiently infer an actually available performance in a system in which a plurality of BWPs are activated and resources and assigned and changed in units of beams regardless of a BWP. Also, such a model may be meaningfully used in a non-licensed band where listen-before-talk is simultaneously or sequentially performed by using the plurality of BWPs. In the non-licensed band where LBT is to be performed, the base station may also perform LBT by using the plurality of BWPs configured to the terminal and transmit a reference signal by using a BWP where LBT is successful. The terminal that receives the reference signals where LBT is successful is not guaranteed to periodically receive all reference signals even when resources are periodically assigned. Accordingly, in such a non-licensed environment, FIG. 4A may be used to derive the cell quality by only using the reference signals transmitted as LBT is successful.

Figure 4B:
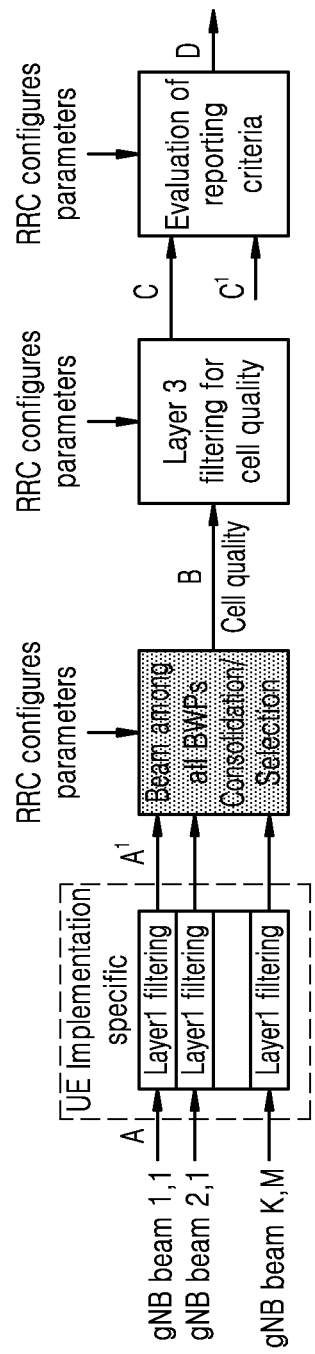
FIG. 4B is a diagram showing a measurement model in a multiple beam multiple BWP environment for a terminal to derive the quality of any cell.

FIG. 4B is a diagram showing a measurement model in a multiple beam multiple BWP environment for a terminal to derive the quality of any cell.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIG. 4B, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.
1. When a base station transmits an explicit BWP ID when transmitting a reference signal
   A. When the BWP ID is included in an equation for generating a reference signal ID
   B. When the BWP ID is included in a signal that is simultaneously or continuously transmitted with the reference signal
2. When a base station pre-configured, to a terminal, BWPs corresponding to reference signals by using an RRC signal, an MAC signal, or the like
3. When a correlation between a BWP ID and a reference ID has been defined according to an implicit rule pre-determined between a base station and a terminal Referring to FIG. 4B, the terminal performs L1 filtering on synchronization signals, such as SSBs or CSI-RSs having a same ID, indicating the base station beams that are periodically received, for example, the base station beams distinguishable by the terminal.

Thereafter, the terminal derives one cell quality measurement value via BWP selecting and merging processes regarding a plurality of beams included in the plurality of BWPs so as to derive a single measurement value for determining the quality of the cell. During the beam selection and consolidation processes, the terminal may derive a single cell quality measurement value by comparing and selecting the beams via a following method.
1. A method of selecting a beam measurement value having a best measurement value
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding cell is not suitable for an access.
3. A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding cell is not suitable for an access.

To derive a cell quality measurement value, when the required parameters, for example, the maximum number of beams for obtaining the average, the beam consolidation threshold value, and the reference signal type, are not entirely or partially configured, the terminal may not perform such derivation, but may simply derive a cell value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

Next, the terminal performs L3 filtering on the single cell quality value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, when the cell quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may report a measurement value to the base station.

Figure 4C:
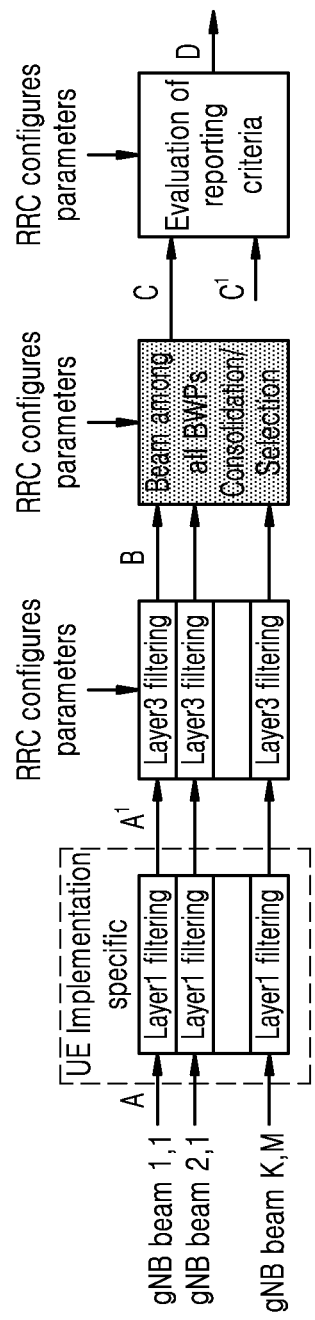
FIG. 4C is a diagram showing a measurement model in a multiple beam multiple BWP environment for a terminal to derive the quality of any cell.

FIG. 4C is a diagram showing a measurement model in a multiple beam multiple BWP environment for a terminal to derive the quality of any cell.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIG. 4C, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.
 1. When a base station transmits an explicit BWP ID when transmitting a reference signal
  A. When the BWP ID is included in an equation for generating a reference signal ID
  B. When the BWP ID is included in a signal that is simultaneously or continuously transmitted with the reference signal
 2. When a base station pre-configured, to a terminal, BWPs corresponding to reference signals by using an RRC signal, an MAC signal, or the like
 3. When a correlation between a BWP ID and a reference ID has been defined according to an implicit rule pre-determined between a base station and a terminal Referring to FIG. 4C, the terminal performs L1 filtering on synchronization signals, such as SSBs or CSI-RSs having a same ID, indicating the base station beams that are periodically received, for example, the base station beams distinguishable by the terminal.

Next, the terminal performs L3 filtering on each beam quality measurement value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Thereafter, the terminal derives one cell quality measurement value via BWP selecting and merging processes regarding a plurality of beams included in the plurality of BWPs so as to derive a single measurement value for determining the quality of the cell. During the beam selection and consolidation processes, the terminal may derive a single cell quality measurement value by comparing and selecting the beams via a following method.
 1. A method of selecting a beam measurement value having a best measurement value
 2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding cell is not suitable for an access.
 3. A method of obtaining an average by sequentially selecting N beam measurement values having good measurement values from a beam having a best measurement value.
 4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding cell is not suitable for an access.

To derive a cell quality measurement value, when the required parameters, for example, the maximum number of beams for obtaining the average, the beam consolidation threshold value, and the reference signal type, are not entirely or partially configured, the terminal may not perform such derivation, but may simply derive a cell value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

Then, when the cell quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may report a measurement value to the base station.

FIGS. 4D through 4H are diagrams showing a measurement model in a multiple beam multiple BWP environment for a terminal to derive the quality of any cell.

Figure 4D:
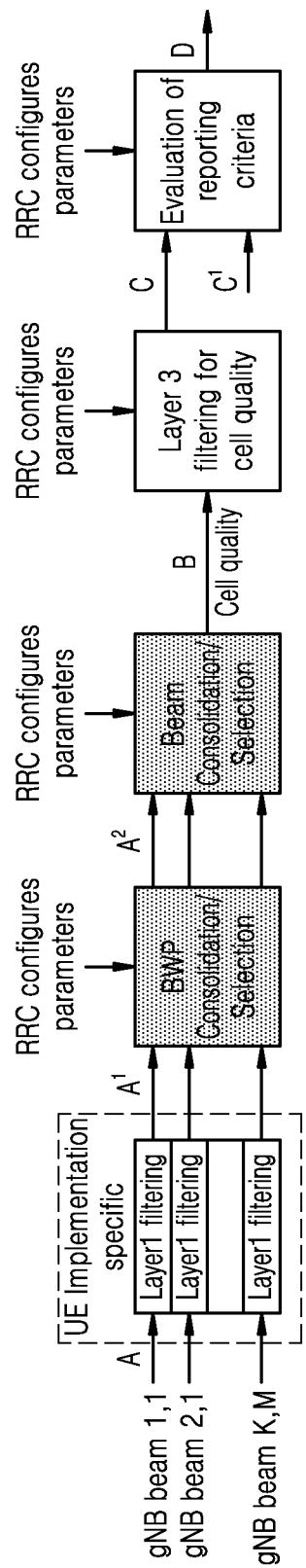
FIG. 4D is a diagram showing a measurement model in a multiple beam multiple BWP environment for a terminal to derive the quality of any cell.

FIG. 4D illustrates an example of deriving beam and cell quality values after performing L1 filtering, and then performing L3 filtering.

Figure 4E:
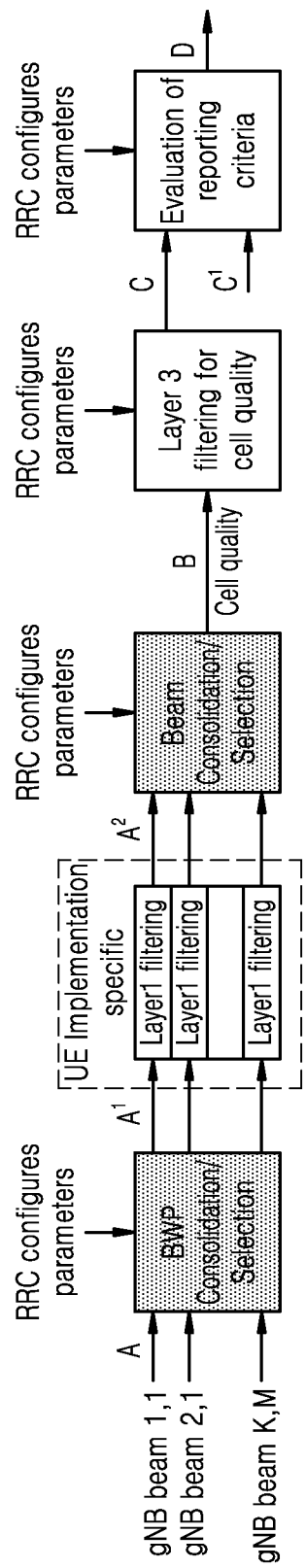
FIG. 4E is a diagram showing a measurement model in a multiple beam multiple BWP environment for a terminal to derive the quality of any cell.

FIG. 4E illustrates an example of deriving a beam quality value, and deriving a cell quality value after performing L1 filtering, and then performing L3 filtering.

Figure 4F:
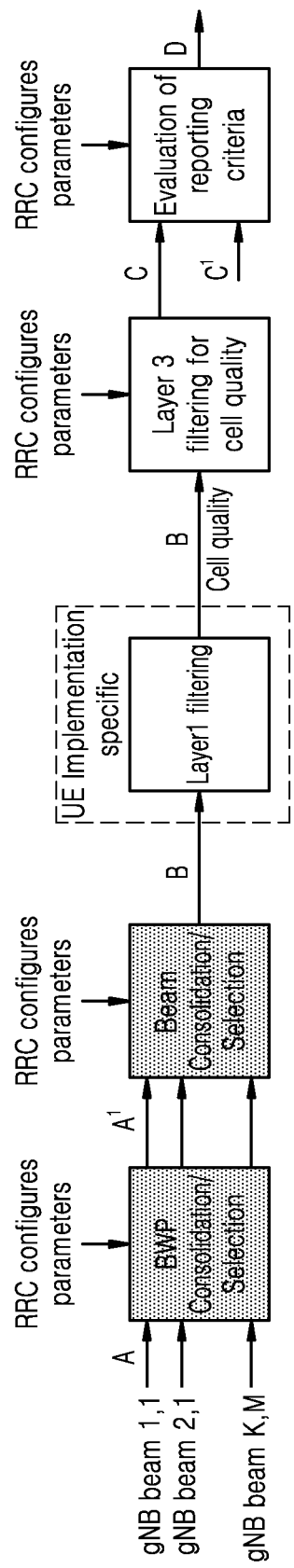
FIG. 4F is a diagram showing a measurement model in a multiple beam multiple BWP environment for a terminal to derive the quality of any cell.

FIG. 4F illustrates an example of deriving beam and cell quality values, and then performing L1 filtering and L3 filtering.

Figure 4G:
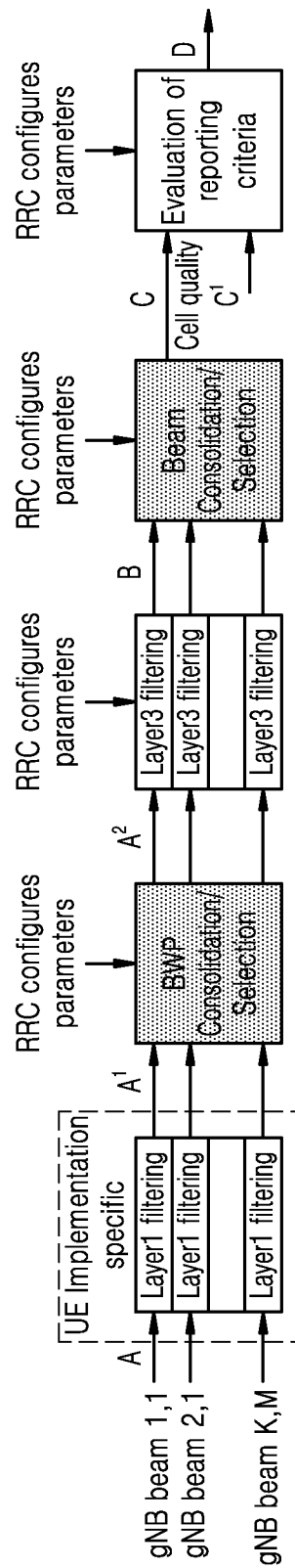
FIG. 4G is a diagram showing a measurement model in a multiple beam multiple BWP environment for a terminal to derive the quality of any cell.

FIG. 4G illustrates an example of deriving a beam quality value after performing L1 filtering, and then deriving a cell quality value after performing L3 filtering.

Figure 4H:
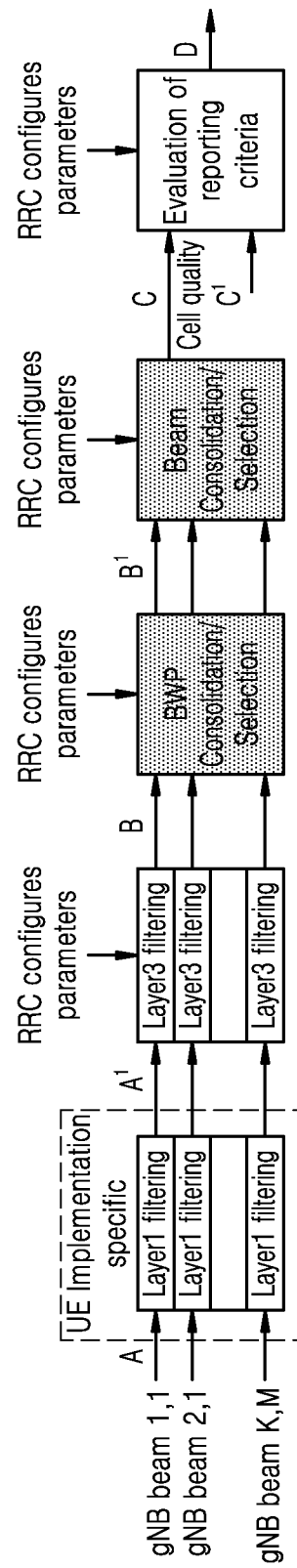
FIG. 4H is a diagram showing a measurement model in a multiple beam multiple BWP environment for a terminal to derive the quality of any cell.

FIG. 4H illustrates an example of deriving beam and cell quality values after performing L1 filtering and L3 filtering.

A network may configure, to the terminal, parameters for deriving measurement results, such as RSRP, RSRQ, SINR, and CQI per cell representing each cell. For example, the network may configure, to the terminal, a maximum number of beams for obtaining an average, a beam consolidation threshold value, a reference signal type, and the like. Also, the network may configure, to the terminal, parameters for deriving measurement results, such as RSRP, RSRQ, SINR, and CQI per BWP representing each BWP in any cell. For example, the network may configure, to the terminal, a maximum number of beams for obtaining an average, a beam consolidation threshold value, a reference signal type, and the like.

Referring to FIGS. 4D through 4H, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong.

The terminal derives one beam quality measurement value via BWP selecting and merging processes regarding the plurality of different BWPs where each of the beams is transmitted, so as to derive a single measurement value for determining the quality of the beams. During the BWP selecting and merging processes, the terminal may derive a single beam quality measurement value by comparing and selecting the different BWPs where a specific beam is transmitted, via a following method.

1. A method of selecting a BWP measurement value having a best measurement value.
2. A method of selecting a BWP measurement value having a best measurement value from among BWP measurement values having a value equal to or greater than a specific threshold value configured by the base station via any downlink signal (an RRC signal, an MAC signal, or a PHY signal). Here, when there is no BWP measurement value having a value equal to or greater than the certain threshold value, the terminal may determine that a corresponding beam is not suitable for use.
3. A method of obtaining an average by sequentially selecting N BWP measurement values having good measurement values from a BWP having a best measurement value.
4. A method of selecting BWP measurement values having a value equal to or greater than a certain threshold value configured via any downlink signal (an RRC signal, an MAC signal, or a PHY signal), and sequentially selecting N BWP measurement values having good measurement values from a BWP having a best measurement value among the selected BWP measurement values and obtaining an average thereof. Here, a method of, when the number of BWPs equal to or greater than the certain threshold value is less than N, only selecting these BWPs and obtaining the average. Here, when there is no BWP equal to or greater than the certain threshold value, the terminal may determine that a corresponding beam is not suitable for use.

To derive a beam quality measurement value, when required parameters, for example, a maximum number of BWPs for obtaining the average, a BWP consolidation threshold value, and the reference signal type, are not entirely or partially configured, the terminal may not perform such derivation, but may simply derive a beam value with a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs for obtaining the average is configured. Also, the terminal may perform a second operation when only the BWP consolidation threshold value is configured. Also, the terminal may perform a fourth operation when both the maximum number of BWPs for obtaining the average and the BWP consolidation threshold value are configured. Also, the terminal may perform a first operation when nothing is configured.

Thereafter, the terminal derives one cell quality measurement value via beam selection and consolidation processes regarding the plurality of beams so as to derive a single measurement value for determining the quality of the cell. During the beam selection and consolidation processes, the terminal may derive a single cell quality measurement value by comparing and selecting the beams via a following method.

1. A method of selecting a beam measurement value having a best measurement value
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding cell is not suitable for an access.

A method of obtaining an average by sequentially selecting N beam measurement values having good measurement values from a beam having a best measurement value.

4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding cell is not suitable for an access.

To derive a cell quality measurement value, when the required parameters, for example, the maximum number of beams for obtaining the average, the beam consolidation threshold value, and the reference signal type, are not entirely or partially configured, the terminal may not perform such derivation, but may simply derive a cell value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

Then, when the cell quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may report a measurement value to the base station.

FIGS. 4I through 4M are diagrams showing a measurement model in a multiple beam multiple BWP environment for a terminal to derive the quality of any cell.

Figure 4I:
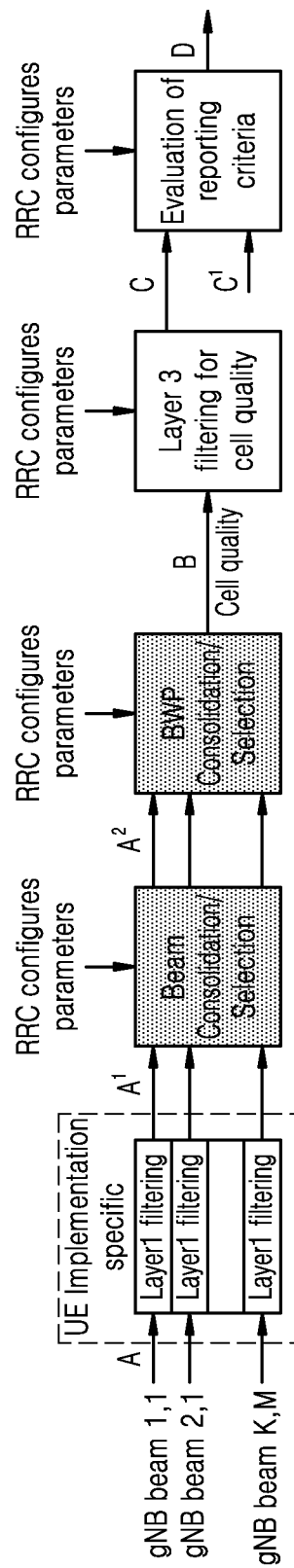
FIG. 4I is a diagram showing a measurement model in a multiple beam multiple BWP environment for a terminal to derive the quality of any cell.

FIG. 4I illustrates an example of deriving BWP and cell quality values after performing L1 filtering, and then performing L3 filtering.

Figure 4J:
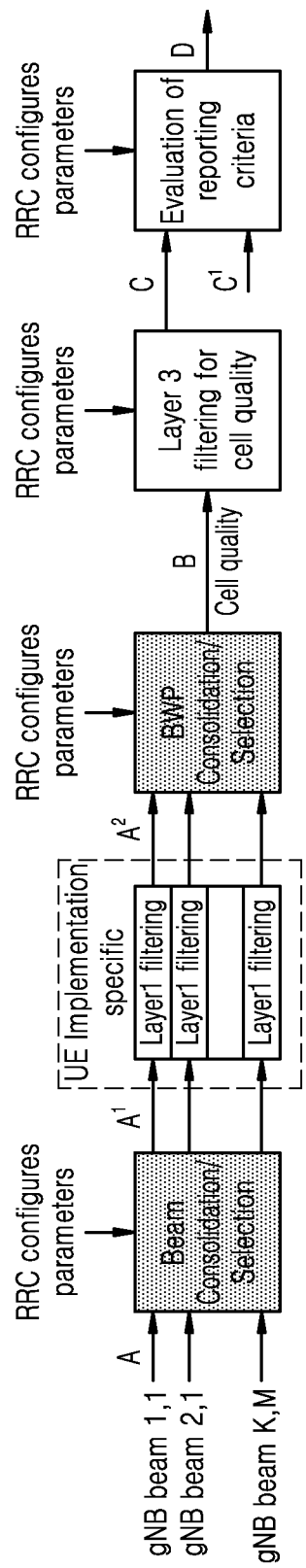
FIG. 4J is a diagram showing a measurement model in a multiple beam multiple BWP environment for a terminal to derive the quality of any cell.

FIG. 4J illustrates an example of deriving a BWP quality value, and deriving a cell quality value after performing L1 filtering, and then performing L3 filtering.

Figure 4K:
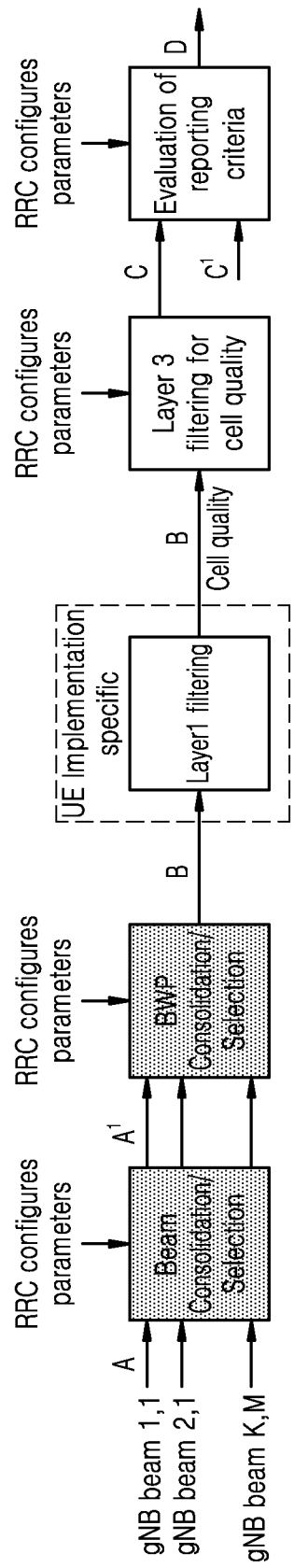
FIG. 4K is a diagram showing a measurement model in a multiple beam multiple BWP environment for a terminal to derive the quality of any cell.

FIG. 4K illustrates an example of deriving BWP and cell quality values, and then performing L1 filtering and L3 filtering.

Figure 4L:
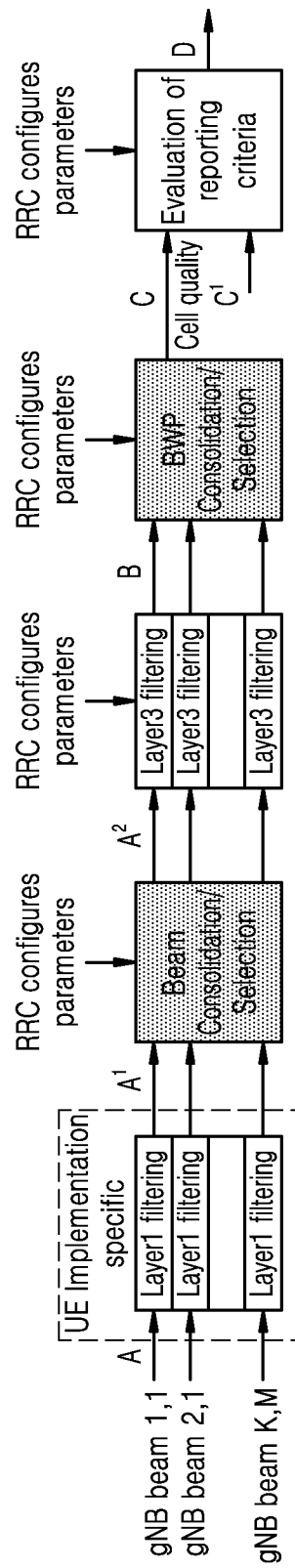
FIG. 4L is a diagram showing a measurement model in a multiple beam multiple BWP environment for a terminal to derive the quality of any cell.

FIG. 4L illustrates an example of deriving a BWP quality value after performing L1 filtering, and then deriving a cell quality value after performing L3 filtering.

Figure 4M:
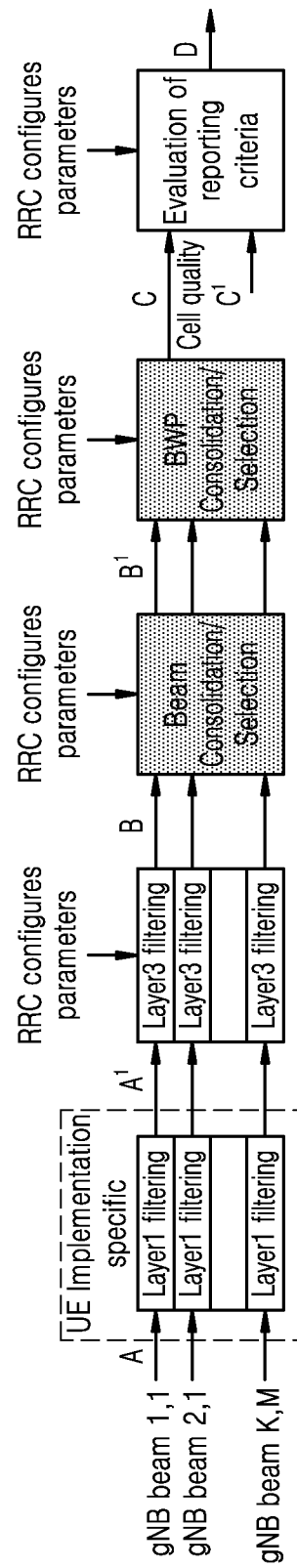
FIG. 4M is a diagram showing a measurement model in a multiple beam multiple BWP environment for a terminal to derive the quality of any cell.

FIG. 4M illustrates an example of deriving BWP and cell quality values after performing L1 filtering and L3 filtering.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIGS. 4I through 4M, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong.

Thereafter, the terminal may derive one BWP quality measurement value via beam selection and consolidation processes regarding a plurality of beams included in each BWP, so as to derive a single measurement value for determining the quality of each BWP. During the beam selection and consolidation processes, the terminal may derive a single BWP quality measurement value by comparing and selecting the beams via a following method.

1. A method of selecting a beam measurement value having a best measurement value
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding BWP is not suitable to be used.
3. A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding BWP is not suitable to be used.

To derive a BWP quality measurement value, when the required parameters, for example, the maximum number of beams for obtaining the average, the beam consolidation threshold value, and the reference signal type, are not entirely or partially configured, the terminal may not perform such derivation, but may simply derive a BWP value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

The parameters for deriving the BWP quality measurement value may configure common values to be commonly used in all BWPs in the cell or may configure different values for each BWP.

Thereafter, the terminal derives one cell quality measurement value via BWP selecting and merging processes regarding the plurality of BWPs so as to derive a single measurement value for determining the quality of the cell. During the BWP selecting and merging processes, the terminal may derive a single cell quality measurement value by comparing and selecting the BWPs via a following method.

1. A method of selecting a BWP measurement value having a best measurement value.
2. A method of selecting a BWP measurement value having a best measurement value from among BWP measurement values having a value equal to or greater than a specific threshold value configured by the base station via any downlink signal (an RRC signal, an MAC signal, or a PHY signal). Here, when there is no BWP measurement value having a value equal to or greater than the certain threshold value, the terminal may determine that a corresponding cell is not suitable for an access.
3. A method of obtaining an average by sequentially selecting N' BWP measurement values having good measurement values from a BWP having a best measurement value.
4. A method of selecting BWP measurement values having a value equal to or greater than a certain threshold value configured via any downlink signal (an RRC signal, an MAC signal, or a PHY signal), and sequentially selecting N' BWP measurement values having good measurement values from a BWP having a best measurement value among the selected BWP measurement values and obtaining an average thereof. Here, a method of, when the number of BWPs equal to or greater than the certain threshold value is less than N', only selecting these BWPs and obtaining the average. Here, when there is no BWP equal to or greater than the certain threshold value, the terminal may determine that a corresponding cell is not suitable for an access.

To derive a cell quality measurement value, when required parameters, for example, a maximum number of BWPs for obtaining the average, a BWP consolidation threshold value, and the reference signal type, are not entirely or partially configured, the terminal may not perform such derivation, but may simply derive a cell value with a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs for obtaining the average is configured. Also, the terminal may perform a second operation when only the BWP consolidation threshold value is configured. Also, the terminal may perform a fourth operation when both the maximum number of BWPs for obtaining the average and the BWP consolidation threshold value are configured. Also, the terminal may perform a first operation when nothing is configured.

Figure 5A:
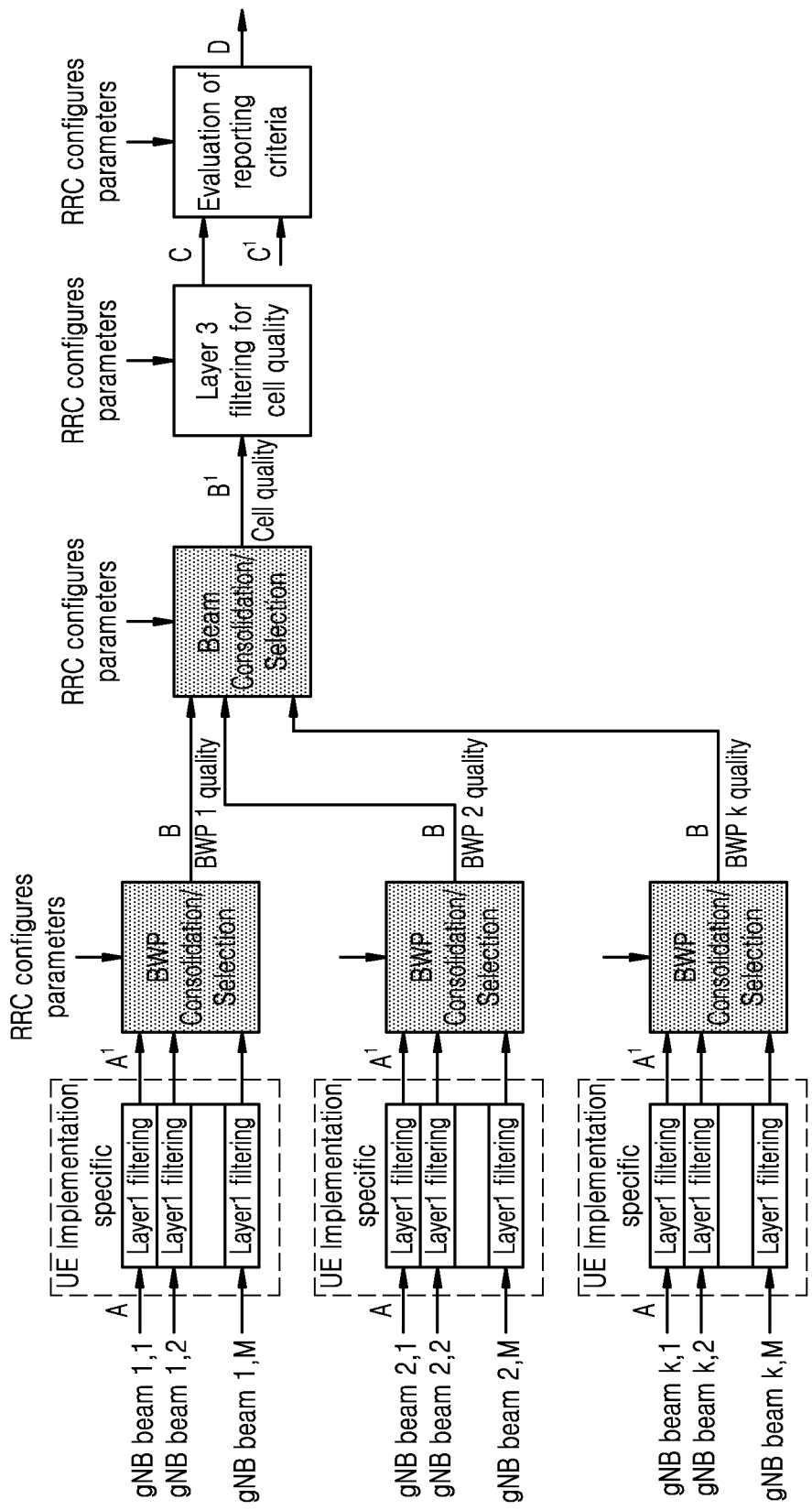
FIG. 5A is a diagram showing a measurement model in a multiple beam multiple BWP environment for a terminal to derive the quality of any cell.

FIG. 5A is a diagram showing a measurement model in a multiple beam multiple BWP environment for a terminal to derive the quality of any cell.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIG. 5A, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.

1. When a base station transmits an explicit BWP ID when transmitting a reference signal
    A. When the BWP ID is included in an equation for generating a reference signal ID
    B. When the BWP ID is included in a signal that is simultaneously or continuously transmitted with the reference signal
2. When a base station pre-configured, to a terminal, BWPs corresponding to reference signals by using an RRC signal, an MAC signal, or the like
3. When a correlation between a BWP ID and a reference ID has been defined according to an implicit rule pre-determined between a base station and a terminal Referring to FIG. 5A, the terminal performs L1 filtering on synchronization signals, such as SSBs or CSI-RSs having a same ID, indicating the base station beams that are periodically received, for example, the base station beams distinguishable by the terminal.

Then, the terminal derives one beam quality measurement value via BWP selecting and merging processes regarding the plurality of different BWPs where each beam is transmitted, so as to derive a single measurement value for determining the quality of each beam. During the BWP selecting and merging processes, the terminal may derive a single beam quality measurement value by comparing and selecting the different BWPs where a specific beam is transmitted, via a following method.
1. A method of selecting a BWP measurement value having a best measurement value.
2. A method of selecting a BWP measurement value having a best measurement value from among BWP measurement values having a value equal to or greater than a specific threshold value configured by the base station via any downlink signal (an RRC signal, an MAC signal, or a PHY signal). Here, when there is no BWP measurement value having a value equal to or greater than the certain threshold value, the terminal may determine that a corresponding beam is not suitable for use.
3. A method of obtaining an average by sequentially selecting N BWP measurement values having good measurement values from a BWP having a best measurement value.
4. A method of selecting BWP measurement values having a value equal to or greater than a certain threshold value configured via any downlink signal (an RRC signal, an MAC signal, or a PHY signal), and sequentially selecting N BWP measurement values having good measurement values from a BWP having a best measurement value among the selected BWP measurement values and obtaining an average thereof. Here, a method of, when the number of BWPs equal to or greater than the certain threshold value is less than N, only selecting these BWPs and obtaining the average. Here, when there is no BWP equal to or greater than the certain threshold value, the terminal may determine that a corresponding beam is not suitable for use.

To derive a beam quality measurement value, when required parameters, for example, a maximum number of BWPs for obtaining the average, a BWP consolidation threshold value, and the reference signal type, are not entirely or partially configured, the terminal may not perform such derivation, but may simply derive a beam value with a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs for obtaining the average is configured. Also, the terminal may perform a second operation when only the BWP consolidation threshold value is configured. Also, the terminal may perform a fourth operation when both the maximum number of BWPs for obtaining the average and the BWP consolidation threshold value are configured. Also, the terminal may perform a first operation when nothing is configured.

Thereafter, the terminal derives one cell quality measurement value via beam selection and consolidation processes regarding the plurality of beams so as to derive a single measurement value for determining the quality of the cell. During the beam selection and consolidation processes, the terminal may derive a single cell quality measurement value by comparing and selecting the beams via a following method.

1. A method of selecting a beam measurement value having a best measurement value
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding cell is not suitable for an access.

A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding cell is not suitable for an access.

To derive a cell quality measurement value, when the required parameters, for example, the maximum number of beams for obtaining the average, the beam consolidation threshold value, and the reference signal type, are not entirely or partially configured, the terminal may not perform such derivation, but may simply derive a cell value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

Next, the terminal performs L3 filtering on the single cell quality value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, when the cell quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may report a measurement value to the base station.

The method of deriving a measurement value of each beam by selecting and classifying a better BWP for a same beam transmitted from different BWPs, shown in FIG. 5A, is used. By using such a method, the terminal is able to measure and infer which beam direction actually has good channel quality regardless of a BWP, and determine which beam is able to obtain a currently best performance. Also, by primarily deriving the measurement values for such beams and secondarily deriving a cell measurement quality value by using the measurement values, the terminal may be able to infer an obtainable channel quality characteristic while selecting and changing beams from the corresponding cell. Accordingly, the terminal is able to further effectively and accurately derive an available cell measurement value in a system capable of transmitting/receiving data only using one or a few beams by using a plurality of BWPs. Also, such a measurement model enables a performance actually available to the terminal to be further efficiently inferred in a system for assigning and changing a resource in units of beams.

Figure 5B:
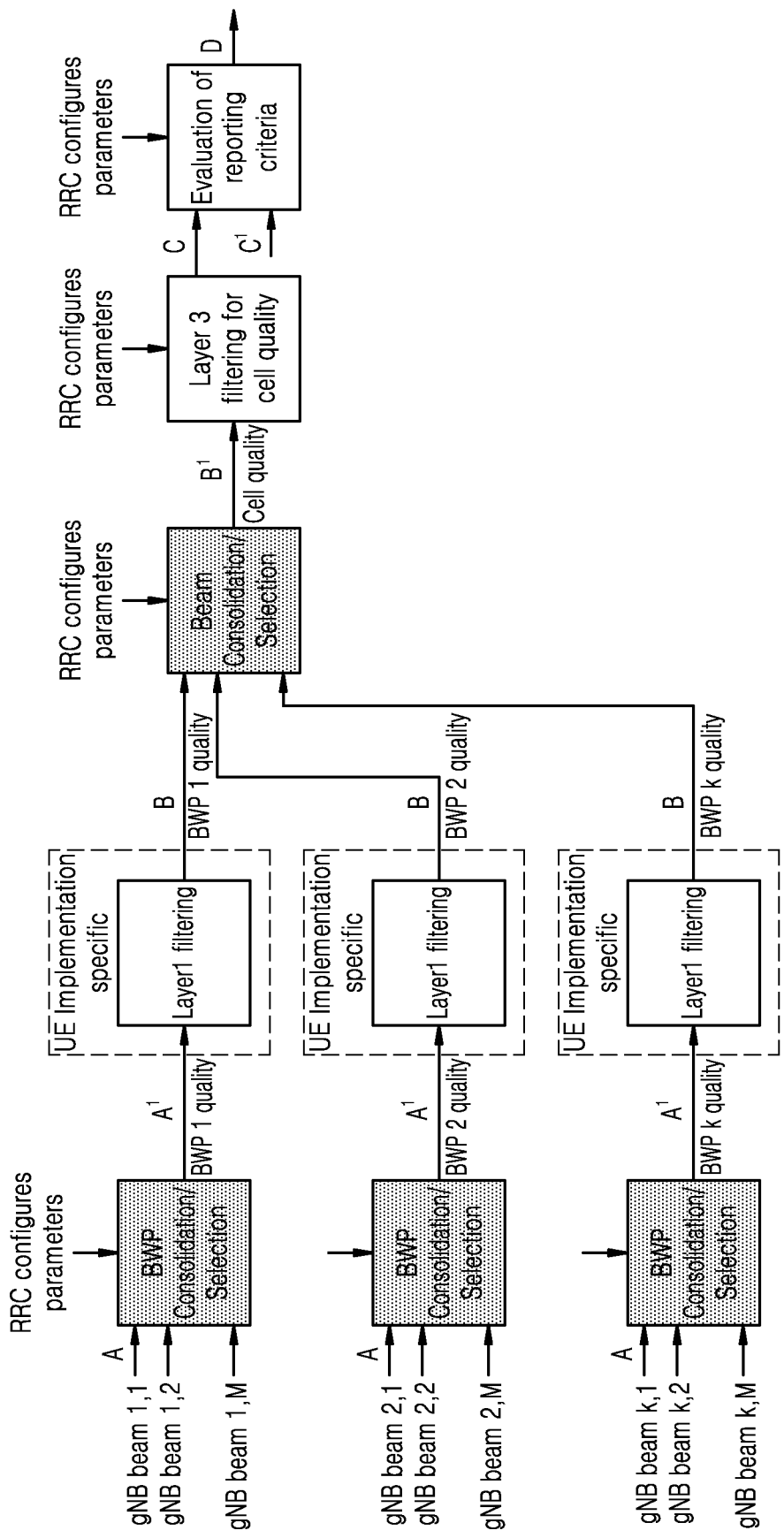
FIG. 5B is a diagram showing a measurement model in a multiple beam multiple BWP environment for a terminal to derive the quality of any cell.

FIG. 5B is a diagram showing a measurement model in a multiple beam multiple BWP environment for a terminal to derive the quality of any cell.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIG. 5B, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.
1. When a base station transmits an explicit BWP ID when transmitting a reference signal
   A. When the BWP ID is included in an equation for generating a reference signal ID
   B. When the BWP ID is included in a signal that is simultaneously or continuously transmitted with the reference signal
2. When a base station pre-configured, to a terminal, BWPs corresponding to reference signals by using an RRC signal, an MAC signal, or the like
3. When a correlation between a BWP ID and a reference ID has been defined according to an implicit rule pre-determined between a base station and a terminal Referring to FIG. 5B, the terminal derives one beam quality measurement value via BWP selecting and merging processes regarding the plurality of different BWPs where each beam is transmitted, so as to derive a single measurement value for determining the quality of each beam. During the BWP selecting and merging processes, the terminal may derive a single beam quality measurement value by comparing and selecting the different BWPs where a specific beam is transmitted, via a following method.
1. A method of selecting a BWP measurement value having a best measurement value.
2. A method of selecting a BWP measurement value having a best measurement value from among BWP measurement values having a value equal to or greater than a specific threshold value configured by the base station via any downlink signal (an RRC signal, an MAC signal, or a PHY signal). Here, when there is no BWP measurement value having a value equal to or greater than the certain threshold value, the terminal may determine that a corresponding beam is not suitable for use.
3. A method of obtaining an average by sequentially selecting N BWP measurement values having good measurement values from a BWP having a best measurement value.
4. A method of selecting BWP measurement values having a value equal to or greater than a certain threshold value configured via any downlink signal (an RRC signal, an MAC signal, or a PHY signal), and sequentially selecting N BWP measurement values having good measurement values from a BWP having a best measurement value among the selected BWP measurement values and obtaining an average thereof. Here, a method of, when the number of BWPs equal to or greater than the certain threshold value is less than N, only selecting these BWPs and obtaining the average. Here, when there is no BWP equal to or greater than the certain threshold value, the terminal may determine that a corresponding beam is not suitable for use.

To derive a beam quality measurement value, when required parameters, for example, a maximum number of BWPs for obtaining the average, a BWP consolidation threshold value, and the reference signal type, are not entirely or partially configured, the terminal may not perform such derivation, but may simply derive a beam value with a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs for obtaining the average is configured. Also, the terminal may perform a second operation when only the BWP consolidation threshold value is configured. Also, the terminal may perform a fourth operation when both the maximum number of BWPs for obtaining the average and the BWP consolidation threshold value are configured. Also, the terminal may perform a first operation when nothing is configured.

Then, the terminal performs L1 filtering on each of base station beams, for example, synchronization signals, such as SSBs or CSI-RSs, having a same ID indicating a base station beam distinguishable by the terminal.

Thereafter, the terminal derives one cell quality measurement value via beam selection and consolidation processes regarding the plurality of beams so as to derive a single measurement value for determining the quality of the cell. During the beam selection and consolidation processes, the terminal may derive a single cell quality measurement value by comparing and selecting the beams via a following method.
1. A method of selecting a beam measurement value having a best measurement value
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding cell is not suitable for an access.

3. A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding cell is not suitable for an access.

To derive a cell quality measurement value, when the required parameters, for example, the maximum number of beams for obtaining the average, the beam consolidation threshold value, and the reference signal type, are not entirely or partially configured, the terminal may not perform such derivation, but may simply derive a cell value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

Next, the terminal performs L3 filtering on the single cell quality value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, when the cell quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may report a measurement value to the base station.

Figure 5C:
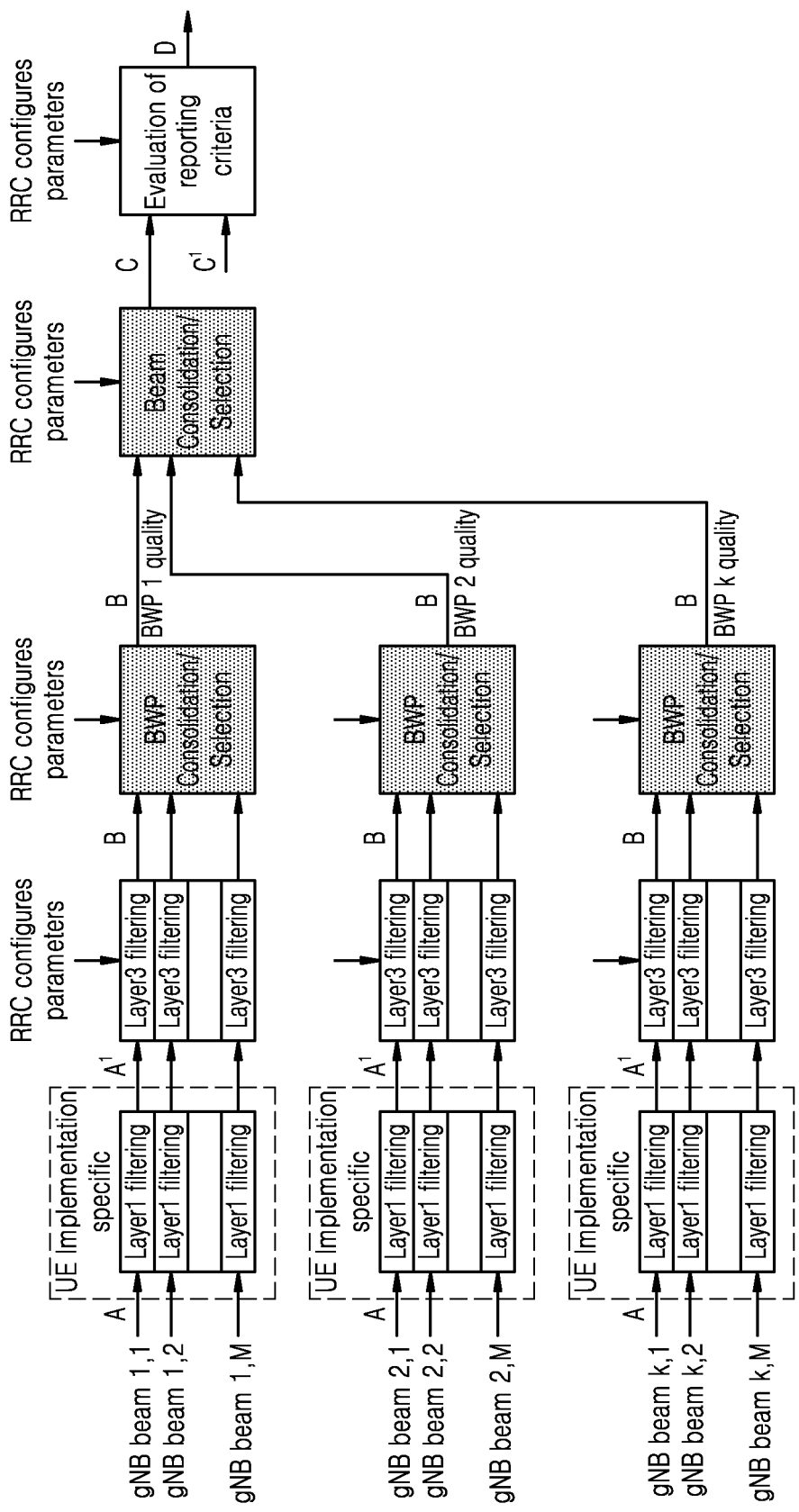
FIG. 5C is a diagram showing a measurement model in a multiple beam multiple BWP environment for a terminal to derive the quality of any cell.

FIG. 5C is a diagram showing a measurement model in a multiple beam multiple BWP environment for a terminal to derive the quality of any cell.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIG. 5C, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.
1. When a base station transmits an explicit BWP ID when transmitting a reference signal
   A. When the BWP ID is included in an equation for generating a reference signal ID
   B. When the BWP ID is included in a signal that is simultaneously or continuously transmitted with the reference signal
2. When a base station pre-configured, to a terminal, BWPs corresponding to reference signals by using an RRC signal, an MAC signal, or the like
3. When a correlation between a BWP ID and a reference ID has been defined according to an implicit rule pre-determined between a base station and a terminal Referring to FIG. 5C, the terminal performs L1 filtering on synchronization signals, such as SSBs or CSI-RSs having a same ID, indicating the base station beams that are periodically received, for example, the base station beams distinguishable by the terminal.

Next, the terminal performs L3 filtering on each beam measurement value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, the terminal derives one beam quality measurement value via BWP selecting and merging processes regarding the plurality of different BWPs where each beam is transmitted, so as to derive a single measurement value for determining the quality of each beam. During the BWP selecting and merging processes, the terminal may derive a single beam quality measurement value by comparing and selecting the different BWPs where a specific beam is transmitted, via a following method.
1. A method of selecting a BWP measurement value having a best measurement value.
2. A method of selecting a BWP measurement value having a best measurement value from among BWP measurement values having a value equal to or greater than a specific threshold value configured by the base station via any downlink signal (an RRC signal, an MAC signal, or a PHY signal). Here, when there is no BWP measurement value having a value equal to or greater than the certain threshold value, the terminal may determine that a corresponding beam is not suitable for use.
3. A method of obtaining an average by sequentially selecting N BWP measurement values having good measurement values from a BWP having a best measurement value.
4. A method of selecting BWP measurement values having a value equal to or greater than a certain threshold value configured via any downlink signal (an RRC signal, an MAC signal, or a PHY signal), and sequentially selecting N BWP measurement values having good measurement values from a BWP having a best measurement value among the selected BWP measurement values and obtaining an average thereof. Here, a method of, when the number of BWPs equal to or greater than the certain threshold value is less than N, only selecting these BWPs and obtaining the average. Here, when there is no BWP equal to or greater than the certain threshold value, the terminal may determine that a corresponding beam is not suitable for use.

To derive a beam quality measurement value, when required parameters, for example, a maximum number of BWPs for obtaining the average, a BWP consolidation threshold value, and the reference signal type, are not entirely or partially configured, the terminal may not perform such derivation, but may simply derive a beam value with a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs for obtaining the average is configured. Also, the terminal may perform a second operation when only the BWP consolidation threshold value is configured. Also, the terminal may perform a fourth operation when both the maximum number of BWPs for obtaining the average and the BWP consolidation threshold value are configured. Also, the terminal may perform a first operation when nothing is configured.

Thereafter, the terminal derives one cell quality measurement value via beam selection and consolidation processes regarding the plurality of beams so as to derive a single measurement value for determining the quality of the cell. During the beam selection and consolidation processes, the terminal may derive a single cell quality measurement value by comparing and selecting the beams via a following method.
1. A method of selecting a beam measurement value having a best measurement value
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding cell is not suitable for an access.

A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding cell is not suitable for an access.

To derive a cell quality measurement value, when the required parameters, for example, the maximum number of beams for obtaining the average, the beam consolidation threshold value, and the reference signal type, are not entirely or partially configured, the terminal may not perform such derivation, but may simply derive a cell value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

Then, when the cell quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may report a measurement value to the base station.

Figure 6A:
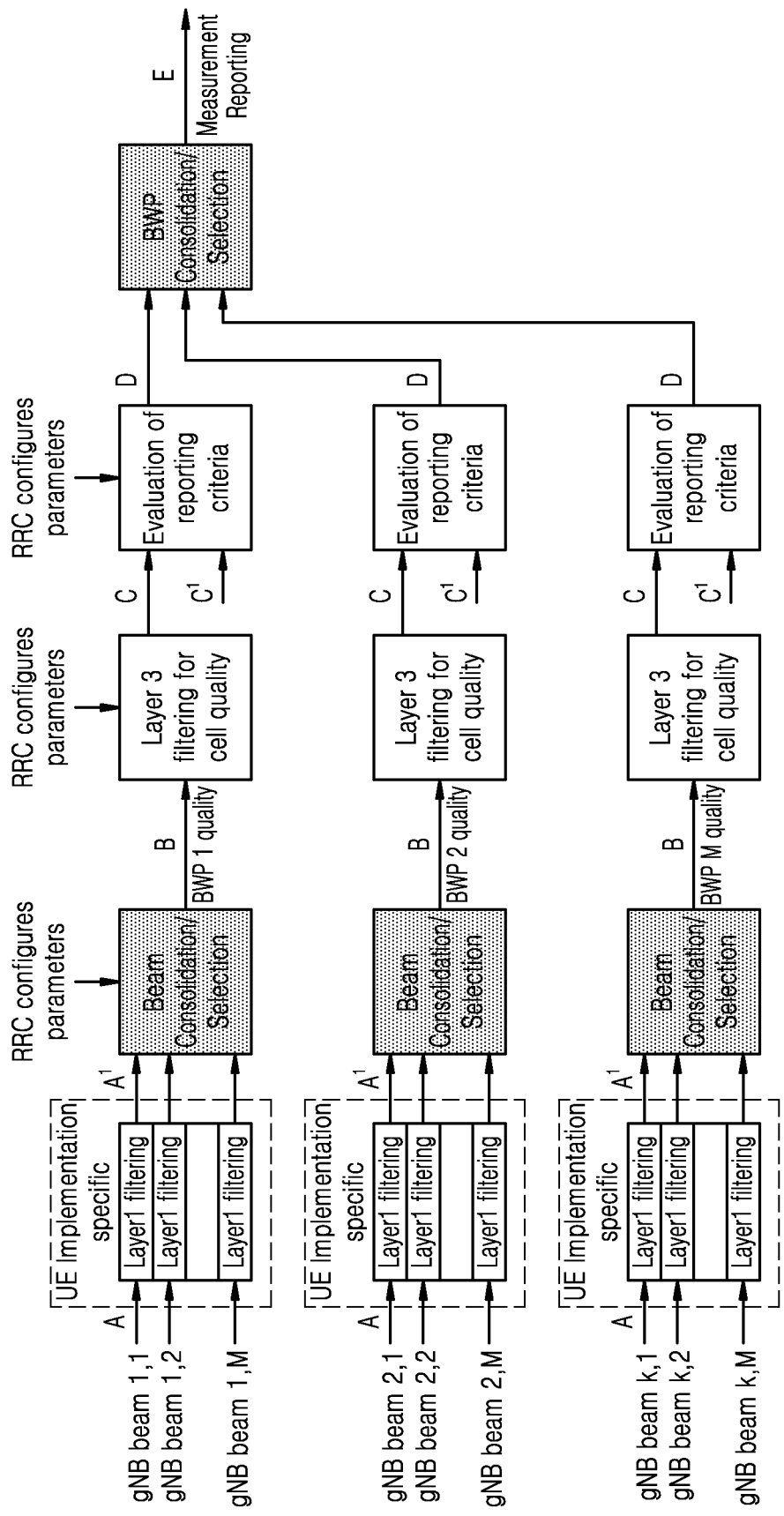
FIG. 6A is a diagram showing a measurement model for a terminal to derive and report the quality of BWPs belonging to any cell.

FIG. 6A is a diagram showing a measurement model for a terminal to derive and report the quality of BWPs belonging to any cell.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIG. 6A, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.

1. When a base station transmits an explicit BWP ID when transmitting a reference signal
   A. When the BWP ID is included in an equation for generating a reference signal ID
   B. When the BWP ID is included in a signal that is simultaneously or continuously transmitted with the reference signal
2. When a base station pre-configured, to a terminal, BWPs corresponding to reference signals by using an RRC signal, an MAC signal, or the like
3. When a correlation between a BWP ID and a reference ID has been defined according to an implicit rule pre-determined between a base station and a terminal Referring to FIG. 6A, the terminal performs L1 filtering on synchronization signals, such as SSBs or CSI-RSs having a same ID, indicating the base station beams that are periodically received, for example, the base station beams distinguishable by the terminal.

Thereafter, the terminal may derive one BWP quality measurement value via beam selection and consolidation processes regarding a plurality of beams included in each BWP, so as to derive a single measurement value for determining the quality of each BWP. During the beam selection and consolidation processes, the terminal may derive a single BWP quality measurement value by comparing and selecting the beams via a following method.

1. A method of selecting a beam measurement value having a best measurement value
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding BWP is not suitable to be used.
3. A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding BWP is not suitable to be used.

To derive a BWP quality measurement value, when the required parameters, for example, the maximum number of beams for obtaining the average, the beam consolidation threshold value, and the reference signal type, are not entirely or partially configured, the terminal may not perform such derivation, but may simply derive a BWP value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

The parameters for deriving the BWP quality measurement value may configure common values to be commonly used in all BWPs in the cell or may configure different values for each BWP.

Next, the terminal performs L3 filtering on each BWP quality value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, when each BWP quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may determine that BWPs that satisfied the standard to be BWPs for reporting measurement. For such a report, the base station may configure, to the terminal, a measurement report for each BWP by configuring a downlink signal as below.

Then, the terminal generates one measurement report message including measurement values of different BWPs via the BWP selecting and merging processes for the plurality of BWPs so as to select BWPs to be reported. During such BWP selecting and merging processes, the terminal is able to compare and select BWPs via a following method, and such a method is obviously transmitted to the terminal by the base station via an RRC signal or the like.

1. A method of selecting a BWP measurement value having a best measurement value and including the same to a report.
2. A method of selecting a BWP measurement value having a best measurement value from among BWP measurement values having a value equal to or greater than a specific threshold value configured by the base station via any downlink signal (an RRC signal, an MAC signal, or a PHY signal), and including the same to a report. Here, when there is no BWP measurement value having a value equal to or greater than the certain threshold value, the terminal may determine that a corresponding cell is not suitable for an access.
3. A method of selecting a BWP measurement value having a value equal to or greater than a specific threshold value configured by the base station via any downlink signal (an RRC signal, an MAC signal, or a PHY signal), and including the same to a report. Here, when there is no BWP measurement value having a value equal to or greater than the certain threshold value, the terminal may determine that a corresponding cell is not suitable for an access.
4. A method of sequentially selecting N' BWP measurement values having good measurement values from a BWP having a best measurement value, and including the same to a report.

5. A method of including, to a report, a cell value obtained by sequentially selecting and averaging N' BWP measurement values having good measurement values from a BWP having a best measurement value.
6. A method of selecting BWP measurement values having a value equal to or greater than a certain threshold value configured via any downlink signal (an RRC signal, an MAC signal, or a PHY signal), sequentially selecting N' BWP measurement values having good measurement values from a BWP having a best measurement value among the selected BWP measurement values, and including the same to a report. Here, a method of, when the number of BWPs equal to or greater than the certain threshold value is less than N', only including these BWPs to a report. Here, when there is no BWP equal to or greater than the certain threshold value, the terminal may determine that a corresponding cell is not suitable for an access.
7. A method of selecting BWP measurement values having a value equal to or greater than a certain threshold value configured via any downlink signal (an RRC signal, an MAC signal, or a PHY signal), and including, to a report, a cell value obtained by sequentially selecting and averaging N' BWP measurement values having good measurement values from a BWP having a best measurement value among the selected BWP measurement values. Here, a method of, when the number of BWPs equal to or greater than the certain threshold value is less than N', including, to a report, a cell value obtained by only selecting and averaging these BWPs. Here, when there is no BWP equal to or greater than the certain threshold value, the terminal may determine that a corresponding cell is not suitable for an access.

To derive and select the BWP to be reported, when the required parameters, for example, the maximum number of BWPs, the BWP consolidation threshold value, and the reference signal type, are not entirely or partially configured, the terminal may not perform such derivation, but may simply report a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs is configured. Also, the terminal may perform a second operation when only the BWP consolidation threshold value is configured. Also, the terminal may perform a fourth operation when both the maximum number of BWPs and the BWP consolidation threshold value are configured. Also, the terminal may perform a first operation when nothing is configured.

Figure 6B:
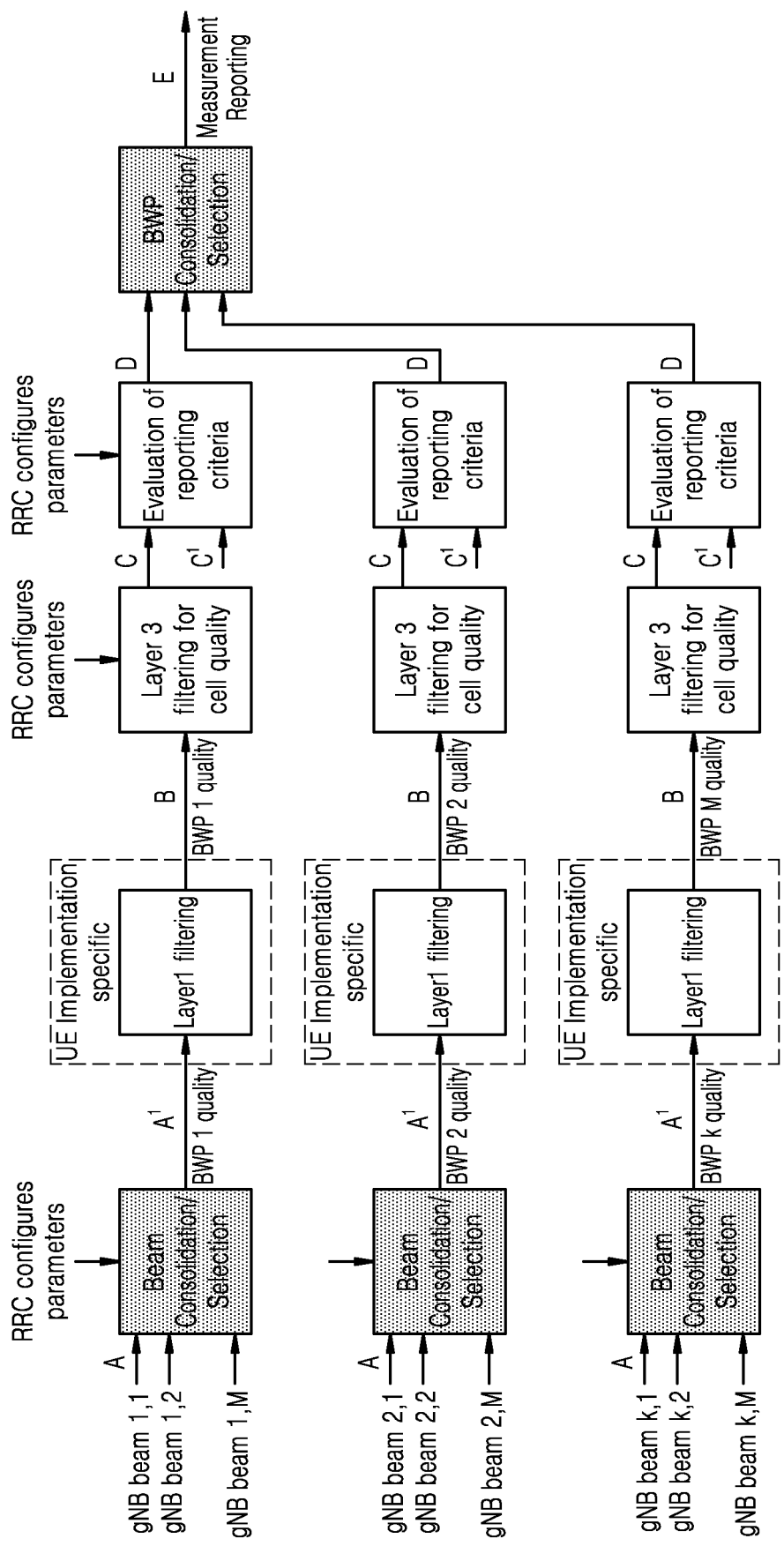
FIG. 6B is a diagram showing a measurement model for a terminal to derive and report the quality of BWPs belonging to any cell.

FIG. 6B is a diagram showing a measurement model for a terminal to derive and report the quality of BWPs belonging to any cell.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIG. 6B, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.
1. When a base station transmits an explicit BWP ID when transmitting a reference signal
    A. When the BWP ID is included in an equation for generating a reference signal ID
    B. When the BWP ID is included in a signal that is simultaneously or continuously transmitted with the reference signal
2. When a base station pre-configured, to a terminal, BWPs corresponding to reference signals by using an RRC signal, an MAC signal, or the like
3. When a correlation between a BWP ID and a reference ID has been defined according to an implicit rule pre-determined between a base station and a terminal Referring to FIG. 6B, the terminal may derive one BWP quality measurement value via beam selection and consolidation processes regarding a plurality of beams included in each BWP, so as to derive a single measurement value for determining the quality of each BWP. During the beam selection and consolidation processes, the terminal may derive a single BWP quality measurement value by comparing and selecting the beams via a following method.
1. A method of selecting a beam measurement value having a best measurement value
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding BWP is not suitable to be used.
3. A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding BWP is not suitable to be used.

To derive a BWP quality measurement value, when the required parameters, for example, the maximum number of beams for obtaining the average, the beam consolidation threshold value, and the reference signal type, are not entirely or partially configured, the terminal may not perform such derivation, but may simply derive a BWP value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

The parameters for deriving the BWP quality measurement value may configure common values to be commonly used in all BWPs in the cell or may configure different values for each BWP.

Next, the terminal performs L1 filtering on each BWP measurement quality value.

Next, the terminal performs L3 filtering on each BWP quality value. For the L3 filtering, the base station may configure, to the terminal, a specific weight factor via any downlink signal (an RRC signal, an MAC signal, or a PHY signal), and the terminal may perform the L3 filtering by using the configured specific weight factor.

Then, when each BWP quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may determine that BWPs that satisfied the standard to be BWPs for reporting measurement. For such a report, the base station may configure, to the terminal, a measurement report for each BWP by configuring a downlink signal as below.

Then, the terminal generates one measurement report message including measurement values of different BWPs via the BWP selecting and merging processes for the plurality of BWPs so as to select BWPs to be reported. During such BWP selecting and merging processes, the terminal is able to compare and select BWPs via a following method, and such a method is obviously transmitted to the terminal by the base station via an RRC signal or the like.

1. A method of selecting a BWP measurement value having a best measurement value and including the same to a report.
2. A method of selecting a BWP measurement value having a best measurement value from among BWP measurement values having a value equal to or greater than a specific threshold value configured by the base station via any downlink signal (an RRC signal, an MAC signal, or a PHY signal), and including the same to a report. Here, when there is no BWP measurement value having a value equal to or greater than the certain threshold value, the terminal may determine that a corresponding cell is not suitable for an access.
3. A method of selecting a BWP measurement value having a value equal to or greater than a specific threshold value configured by the base station via any downlink signal (an RRC signal, an MAC signal, or a PHY signal), and including the same to a report. Here, when there is no BWP measurement value having a value equal to or greater than the certain threshold value, the terminal may determine that a corresponding cell is not suitable for an access.
4. A method of sequentially selecting N' BWP measurement values having good measurement values from a BWP having a best measurement value, and including the same to a report.
5. A method of including, to a report, a cell value obtained by sequentially selecting and averaging N' BWP measurement values having good measurement values from a BWP having a best measurement value.
6. A method of selecting BWP measurement values having a value equal to or greater than a certain threshold value configured via any downlink signal (an RRC signal, an MAC signal, or a PHY signal), sequentially selecting N' BWP measurement values having good measurement values from a BWP having a best measurement value among the selected BWP measurement values, and including the same to a report. Here, a method of, when the number of BWPs equal to or greater than the certain threshold value is less than N', only including these BWPs to a report. Here, when there is no BWP equal to or greater than the certain threshold value, the terminal may determine that a corresponding cell is not suitable for an access.
7. A method of selecting BWP measurement values having a value equal to or greater than a certain threshold value configured via any downlink signal (an RRC signal, an MAC signal, or a PHY signal), and including, to a report, a cell value obtained by sequentially selecting and averaging N' BWP measurement values having good measurement values from a BWP having a best measurement value among the selected BWP measurement values. Here, a method of, when the number of BWPs equal to or greater than the certain threshold value is less than N', including, to a report, a cell value obtained by only selecting and averaging these BWPs. Here, when there is no BWP equal to or greater than the certain threshold value, the terminal may determine that a corresponding cell is not suitable for an access.

To derive and select the BWP to be reported, when the required parameters, for example, the maximum number of BWPs, the BWP consolidation threshold value, and the reference signal type, are not entirely or partially configured, the terminal may not perform such derivation, but may simply report a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs is configured. Also, the terminal may perform a second operation when only the BWP consolidation threshold value is configured. Also, the terminal may perform a fourth operation when both the maximum number of BWPs and the BWP consolidation threshold value are configured. Also, the terminal may perform a first operation when nothing is configured.

Figure 6C:
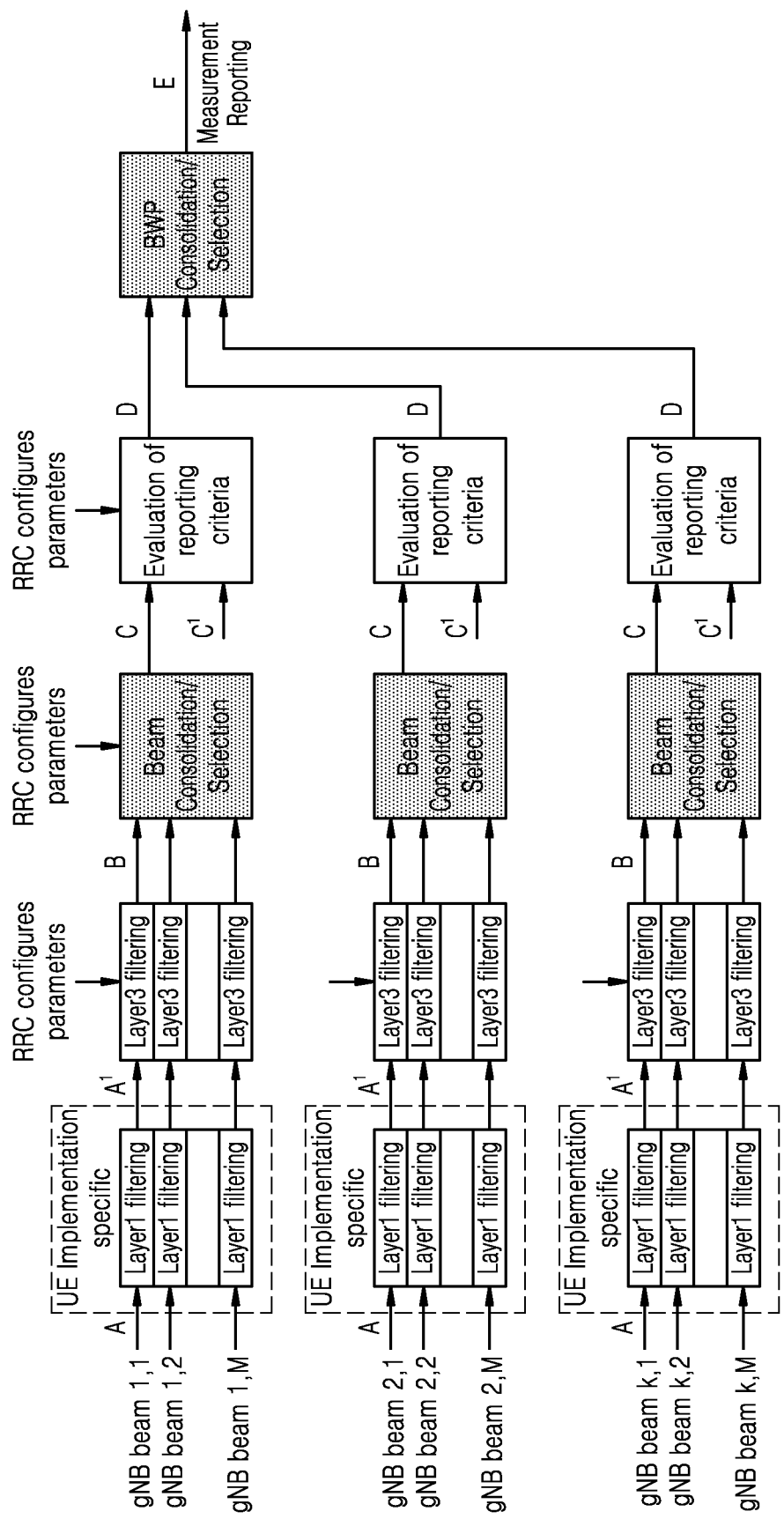
FIG. 6C is a diagram showing a measurement model for a terminal to derive and report the quality of BWPs belonging to any cell.

FIG. 6C is a diagram showing a measurement model for a terminal to derive and report the quality of BWPs belonging to any cell.

A network may configure, to the terminal, parameters, for example, a maximum number of beams for obtaining an average, a beam consolidation threshold value, and a reference signal type, for deriving measurement results, such as RSRP, RSRQ, SINR, and CQI per cell representing each cell. Also, the network may configure, to the terminal, the parameters, for example, the maximum number of beams for obtaining the average, the beam consolidation threshold value, and the reference signal type, for deriving measurement results, such as RSRP, RSRQ, SINR, and CQI per BWP representing each BWP in any cell.

Referring to FIG. 6C, the terminal capable of measuring a serving cell and/or an adjacent cell by using one or more BWPs may receive reference signals, for example, SSBs or CSI-RSs, transmitted by a specific base station (gNB) by using a plurality of partial frequency bandwidths (BWPs), and distinguish transmission beams belonging to different BWPs of different base stations by referring to SSB ID or CSI-RS ID. As such, the terminal that received a periodic synchronization signal transmitted by the base station may continuously measure synchronization signals having a same SSB ID or a same CSI-RS ID to measure qualities of base station beams indicated by the synchronization signals, and distinguish a BWP ID to which the beams belong. Also, the terminal may measure qualities of BWPs and cells to which corresponding synchronization signals belong, from measured qualities of the beams.

A method of distinguishing the BWP ID may be as follows.
4. When a base station transmits an explicit BWP ID when transmitting a reference signal
A. When the BWP ID is included in an equation for generating a reference signal ID
B. When the BWP ID is included in a signal that is simultaneously or continuously transmitted with the reference signal
5. When a base station pre-configured, to a terminal, BWPs corresponding to reference signals by using an RRC signal, an MAC signal, or the like
6. When a correlation between a BWP ID and a reference ID has been defined according to an implicit rule pre-determined between a base station and a terminal Referring to FIG. 6C, the terminal performs L1 filtering on synchronization signals, such as SSBs or CSI-RSs having a same ID, indicating the base station beams that are periodically received, for example, the base station beams distinguishable by the terminal.

Thereafter, the terminal performs L3 filtering on synchronization signals, such as SSBs or CSI-RSs having a same ID, indicating the base station beams that are periodically received, for example, the base station beams distinguishable by the terminal. For the L3 filtering, the base station may configure, to the terminal, a specific weight factor via any downlink signal (an RRC signal, an MAC signal, or a PHY signal), and the terminal may perform the L3 filtering by using the configured specific weight factor.

Thereafter, the terminal may derive one BWP quality measurement value via beam selection and consolidation processes regarding a plurality of beams included in each BWP, so as to derive a single measurement value for determining the quality of each BWP. During the beam selection and consolidation processes, the terminal may derive a single BWP quality measurement value by comparing and selecting the beams via a following method.
1. A method of selecting a beam measurement value having a best measurement value
2. A method of selecting a beam measurement value having a best measurement value from among beam measurement values having a value equal to or greater than a specific threshold value configured by the base station via any downlink signal (an RRC signal, an MAC signal, or a PHY signal). Here, when there is no beam measurement value having a value equal to or greater than the certain threshold value, the terminal may determine that a corresponding BWP is not suitable to be used.
3. A method of obtaining an average by sequentially selecting N beam measurement values having good measurement values from a beam having a best measurement value.
4. A method of selecting beam measurement values having a value equal to or greater than a certain threshold value configured via any downlink signal (an RRC signal, an MAC signal, or a PHY signal), and sequentially selecting N beam measurement values having good measurement values from a beam having a best measurement value among the selected beam measurement values and obtaining an average thereof. Here, a method of, when the number of beams equal to or greater than the certain threshold value is less than N, only selecting these beams and obtaining the average. Here, when there is no beam equal to or greater than the certain threshold value, the terminal may determine that a corresponding BWP is not suitable to be used.

To derive a BWP quality measurement value, when the required parameters, for example, the maximum number of beams for obtaining the average, the beam consolidation threshold value, and the reference signal type, are not entirely or partially configured, the terminal may not perform such derivation, but may simply derive a BWP value with a beam value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of beams for obtaining the average is configured. Also, the terminal may perform a second operation when only the beam consolidation threshold value is configured. Also, the terminal may perform a fourth operation when both the maximum number of beams for obtaining the average and the beam consolidation threshold value are configured. Also, the terminal may perform a first operation when nothing is configured.

Then, when each BWP quality value satisfies a specific measurement report standard configured by the base station via any downlink signal (an RRC signal, an MAC signal, or a PHY signal), for example, when a configured event trigger condition is satisfied or a configured periodic reporting cycle is reached, the terminal may determine that BWPs that satisfied the standard to be BWPs for reporting measurement. For such a report, the base station may configure, to the terminal, a measurement report for each BWP by configuring a downlink signal as below.

Then, the terminal generates one measurement report message including measurement values of different BWPs via the BWP selecting and merging processes for the plurality of BWPs so as to select BWPs to be reported. During such BWP selecting and merging processes, the terminal is able to compare and select BWPs via a following method, and such a method is obviously transmitted to the terminal by the base station via an RRC signal or the like.

1. A method of selecting a BWP measurement value having a best measurement value and including the same to a report.
2. A method of selecting a BWP measurement value having a best measurement value from among BWP measurement values having a value equal to or greater than a specific threshold value configured by the base station via any downlink signal (an RRC signal, an MAC signal, or a PHY signal), and including the same to a report. Here, when there is no BWP measurement value having a value equal to or greater than the certain threshold value, the terminal may determine that a corresponding cell is not suitable for an access.
3. A method of selecting a BWP measurement value having a value equal to or greater than a specific threshold value configured by the base station via any downlink signal (an RRC signal, an MAC signal, or a PHY signal), and including the same to a report. Here, when there is no BWP measurement value having a value equal to or greater than the certain threshold value, the terminal may determine that a corresponding cell is not suitable for an access.
4. A method of sequentially selecting N' BWP measurement values having good measurement values from a BWP having a best measurement value, and including the same to a report.
5. A method of including, to a report, a cell value obtained by sequentially selecting and averaging N' BWP measurement values having good measurement values from a BWP having a best measurement value.
6. A method of selecting BWP measurement values having a value equal to or greater than a certain threshold value configured via any downlink signal (an RRC signal, an MAC signal, or a PHY signal), sequentially selecting N' BWP measurement values having good measurement values from a BWP having a best measurement value among the selected BWP measurement values, and including the same to a report. Here, a method of, when the number of BWPs equal to or greater than the certain threshold value is less than N', only including these BWPs to a report. Here, when there is no BWP equal to or greater than the certain threshold value, the terminal may determine that a corresponding cell is not suitable for an access.
7. A method of selecting BWP measurement values having a value equal to or greater than a certain threshold value configured via any downlink signal (an RRC signal, an MAC signal, or a PHY signal), and including, to a report, a cell value obtained by sequentially selecting and averaging N' BWP measurement values having good measurement values from a BWP having a best measurement value among the selected BWP measurement values. Here, a method of, when the number of BWPs equal to or greater than the certain threshold value is less than N', including, to a report, a cell value obtained by only selecting and averaging these BWPs. Here, when there is no BWP equal to or greater than the certain threshold value, the terminal may determine that a corresponding cell is not suitable for an access.

To derive and select the BWP to be reported, when the required parameters, for example, the maximum number of BWPs, the BWP consolidation threshold value, and the reference signal type, are not entirely or partially configured, the terminal may not perform such derivation, but may simply report a BWP value having the best quality. On the other hand, when the required parameters are entirely or partially configured, the terminal may perform determined operations among the above-described operations. Here, the terminal may perform different operations depending on configured parameters. For example, the terminal may perform a third operation when only the maximum number of BWPs is configured. Also, the terminal may perform a second operation when only the BWP consolidation threshold value is configured. Also, the terminal may perform a fourth operation when both the maximum number of BWPs and the BWP consolidation threshold value are configured. Also, the terminal may perform a first operation when nothing is configured.

A threshold value stated in the drawings and the embodiments may be set to be an absolute value indicating an absolute value (dBW, dBm, or the like) of any measurement value RSRP, RSRQ, SINR, SNR, or CQI. Alternatively, the threshold value stated in the drawings and the embodiments may be set to be a relative value indicating a relative measurement value (dB) from any measurement value RSRP, RSRQ, SINR, SNR, or CQI of a beam, BWP, or cell having a best value in each measurement.

To measure a reference signal for each of multiple BWPs described above, the terminal may receive an RRC message for adjacent cell measurement from the base station, and may be configured with reference signal measurement information for the multiple BWPs and perform measurement. Measurement configuration for adjacent cell measurement of the terminal is in units of frequencies, and frequency information and reference signal information for measurement may be transmitted in following structures and configurations.

```
MeasObject {
  CarrierFrequency: Center frequency
  Bandwidth: Frequency bandwidth
  MeasObjectBWP List: List of one or more bandwidth part configurations (MeasObjectBWP) for performing measurement
}
MeasObjectBWP {
  BWP-Id: ID of BWP
  BWP frequency and bandwidth info: Frequency location and bandwidth information of BWP
  Cell-Id List: List of one or more Cell IDs to be measured in corresponding BWP
  SSB-Measurement-Timing-Config: SMTC commonly applied to cells to be measured in corresponding BWP
  CSI-RS-Measurement-Config List: List of CSR-RS configurations for each of one or more cells to be measured in corresponding BWP
}
```

MeasObject is an information element including a measurement method and measurement information of a unit frequency band measured and reported by a terminal. Here, one MeasObject may include a plurality of MeasObjectBWPs in a form of a list.

MeasObjectBWP is an information element including a measurement method and measurement information of a bandwidth part measured and reported by the terminal. Here, one MeasObjectBWP may include, in a form of a list, a plurality of cells, a plurality of SSB configurations, and a plurality of CSI-RS configurations.

SSB-Measurement-Timing-Config may include one piece of sync signal block measurement timing configuration (SSB-MTC) information or may include one or more pieces of SSB-MTC information in a list.

SSB-MTC information may include a transmission cycle, an offset, and a transmission length of SSBs, and a cell ID list, a BWP ID list, and the like to which corresponding SSB-MTC is applied.

CSI-RS-Measurement-Config may configure the terminal to measure, at time and frequency sides, one or more pieces of CSI-RS resource information transmitted to a corresponding BWP by the base station. Here, a configuration using a hierarchical structure, such as gathering one or more CSI-RS resources to configure a CSI-RS set, or gathering one or more CSI-RS sets to configure CSI-RS setting, may be possible.

CSI-RS configuration information may include CSI-RS ID, a measurement bandwidth, density, a slot configuration, a cycle, an associated SSB ID in a quasi co-located (QCL) relationship, the cell ID list where corresponding CSI-RS is transmitted, and the BWP ID list.

Alternatively, when BWP measurement is to be configured only with CSI-RS, the measurement configuration for adjacent cell measurement of the terminal may be transmitted in a following structure and configuration.

```
MeasObject {
  CarrierFrequency: Center frequency
  Bandwidth: Frequency bandwidth
  SSB-Measurement-Timing-Config: SMTC commonly applied to cells
to be measured in corresponding BWP
  MeasObjectBWP List: List of one or more partial frequency
bandwidth configurations (MeasObjectBWP) for performing measurement
}
MeasObjectBWP {
  BWP-Id: ID of BWP
  BWP frequency and bandwidth info: Frequency location and
bandwidth information of BWP
  Cell-Id List: List of one or more Cell IDs to be measured in
corresponding BWP
  CSI-RS-Measurement-Config List: List of CSR-RS configurations
for each of one or more cells to be measured in corresponding BWP
}
```

MeasObject is an information element including a measurement method and measurement information of a unit frequency band measured and reported by a terminal. Here, one MeasObject may include, in a form of a list, a plurality of MeasObjectBWPs and SSB configuration information measurable at corresponding MeasObject.

MeasObjectBWP is an information element including a measurement method and measurement information of a bandwidth part measured and reported by the terminal. Here, one MeasObjectBWP may include, in a form of a list, a plurality of cells and a plurality of CSI-RS configurations.

Alternatively, when BWP measurement BWP measurement that may be different for each cell to be measured is to be configured, a measurement configuration for adjacent cell measurement of the terminal may be transmitted in a following structure and configuration.

```
MeasObject {
  CarrierFrequency: Center frequency
  Bandwidth: Frequency bandwidth
  MeasObjectCell List: List of one or more partial frequency
bandwidth configurations (MeasObjectBWP) => (MeasObjectCell ?) for
performing measurement
}
MeasObjectCell {
  Cell-Id: ID of cell
  MeasObjectBWP List: List of one or more partial frequency
bandwidth configurations (MeasObjectBWP) for performing measurement
}
MeasObjectBWP {
  BWP-Id: ID of BWP
  BWP frequency and bandwidth info: Frequency location and
bandwidth information of BWP
  SSB-Measurement-Timing-Config: SMTC commonly applied to cells
to be measured in corresponding BWP
  CSI-RS-Measurement-Config List: List of CSR-RS configurations
for each of one or more cells to be measured in corresponding BWP
}
```

MeasObject is an information element including a measurement method and measurement information of a unit frequency band measured and reported by a terminal. Here, one MeasObject may include, in a form of a list, a plurality of MeasObjectCells measurable at corresponding MeasObject.

MeasObjectCell is an information element including a measurement method and measurement information of a cell measured and reported by the terminal. Here, one MeasObjectCell may include a plurality of measurable MeasObjectBWPs in a form of a list.

MeasObjectBWP is an information element including a measurement method and measurement information of a bandwidth part measured and reported by the terminal. Here, one MeasObjectBWP may include, in a form of a list, a plurality of cells, a plurality of SSB configurations, and a plurality of CSI-RS configurations.

Alternatively, when BWP measurement that has a same SSB transmission structure but may be different for each cell to be measured is to be configured, a measurement configuration for adjacent cell measurement of the terminal may be transmitted in a following structure and configuration.

```
MeasObject {
  CarrierFrequency: Center frequency
  Bandwidth: Frequency bandwidth
  MeasObjectCell List: List of one or more partial frequency
bandwidth configurations (MeasObjectBWP) => (MeasObjectCell ?) for
performing measurement
}
MeasObjectCell {
  Cell-Id: ID of cell
  SSB-Measurement-Timing-Config: SMTC commonly applied to cells
to be measured in corresponding BWP
  MeasObjectBWP List: List of one or more partial frequency
bandwidth configurations (MeasObjectBWP) for performing measurement
}
MeasObjectBWP {
  BWP-Id: ID of BWP
  BWP frequency and bandwidth info: Frequency location and
bandwidth information of BWP
  CSI-RS-Measurement-Config List: List of CSR-RS configurations
for each of one or more cells to be measured in corresponding BWP
}
```

MeasObject is an information element including a measurement method and measurement information of a unit frequency band measured and reported by a terminal. Here, one MeasObject may include, in a form of a list, a plurality of MeasObjectCells measurable at corresponding MeasObject.

MeasObjectCell is an information element including a measurement method and measurement information of a cell measured and reported by the terminal. Here, one MeasObjectCell may include a plurality of measurable SSB configurations and a plurality of MeasObjectBWPs, in a form of a list.

MeasObjectBWP is an information element including a measurement method and measurement information of a bandwidth part measured and reported by the terminal. Here, one MeasObjectBWP may include, in a form of a list, a plurality of cells and a plurality of CSI-RS configurations.

Figure 7:
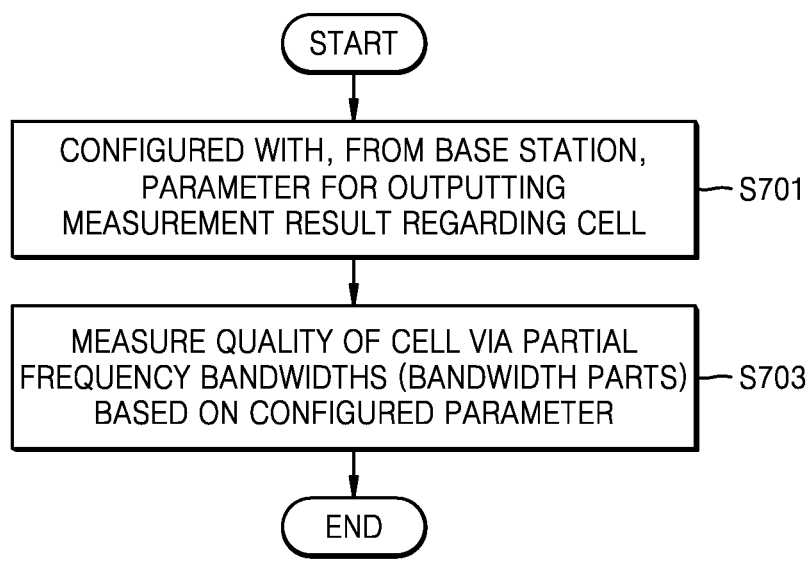
FIG. 7 is a flowchart for describing operation processes of a terminal, according to an embodiment of the present disclosure.

FIG. 7 is a flowchart for describing operation processes of a terminal, according to an embodiment of the present disclosure.

According to an embodiment of the present disclosure, in operation S701, the terminal may be configured with, from a base station, a parameter for outputting a measurement result regarding a cell.

According to an embodiment of the present disclosure, in operation S703, the terminal may measure the quality of the cell via bandwidth parts, based on the configured parameter.

Figure 8:
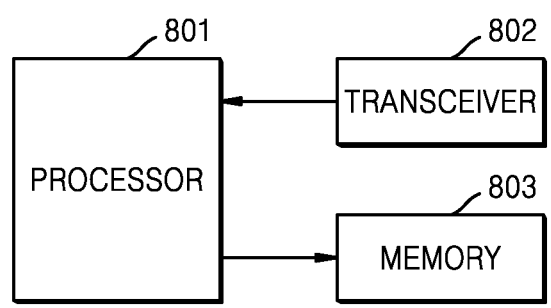
FIG. 8 is a diagram schematically showing a configuration of a terminal, according to an embodiment of the present disclosure.

FIG. 8 is a diagram schematically showing a configuration of a terminal, according to an embodiment of the present disclosure.

Referring to FIG. 8, the terminal may include a processor 801, a transceiver 802, and a memory 803. In the present disclosure, a processor may be defined as a circuit, an application-specific integrated circuit, or at least one processor.

The processor 801 according to an embodiment of the present disclosure may control overall operations of the terminal. For example, the processor 801 may control a signal flow between blocks such that operations according to the above-described flowchart are performed. Also, the processor 801 may record and read data on and from the memory 803. In addition, the processor 801 may perform functions of a protocol stack required in a communication standard. In this regard, the processor 801 may include at least one processor or microprocessor, or may be a part of a processor. A part of the transceiver 802 and the processor 801 may be referred to as a communication processor (CP).

The transceiver 802 according to an embodiment of the present disclosure may perform functions for transmitting/receiving a signal via a radio channel. For example, the transceiver 802 may perform a conversion function between a baseband signal and a bit string, according to physical layer specifications of a system. For example, for data transmission, the transceiver 802 may generate complex symbols by encoding and modulating a transmit bit string. Also, during data reception, the transceiver 802 may reconstruct a reception bit string by demodulating and decoding the baseband signal. Also, the transceiver 802 may up-convert the baseband signal to an RF band signal and then transmits the RF band signal via an antenna, and down-convert the RF band signal received via the antenna to the baseband signal. For example, the transceiver 802 may include a transmit filter, a receive filter, an amplifier, a mixer, an oscillator, a digital-to-analog converter (DAC), and an analog-to-digital converter (ADC). Also, the transceiver 802 may include a plurality of transmission and reception paths. In addition, the transceiver 802 may include at least one antenna array including a plurality of antenna elements. In terms of hardware, the transceiver 802 may include a digital circuit and an analog circuit (for example, a radio frequency integrated circuit (RFIC)). Here, the digital circuit and the analog circuit may be implemented in one package. The transceiver 802 may include a plurality of RF chains.

According to an embodiment of the present disclosure, the memory 803 may store a basic program, an application program, and data such as configuration information, for operations of the terminal. The memory 803 may be configured in a volatile memory, a nonvolatile memory, or a combination of a volatile memory and a nonvolatile memory. Also, the memory 803 may provide the stored data upon request by the processor 801. The memory 803 may store at least one of information transmitted/received via the transceiver 802 and information generated via the processor 801.

Figure 9:
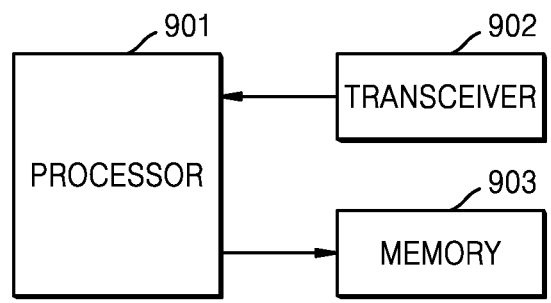
FIG. 9 is a diagram schematically showing a configuration of a base station, according to an embodiment of the present disclosure.

FIG. 9 is a diagram schematically showing a configuration of a base station, according to an embodiment of the present disclosure.

Referring to FIG. 9, the base station may include a processor 901, a transceiver 902, and a memory 903. In the present disclosure, a processor may be defined as a circuit, an application-specific integrated circuit, or at least one processor.

The processor 901 according to an embodiment of the present disclosure may control overall operations of the base station. For example, the processor 901 may control a signal flow between blocks such that operations according to the above-described flowchart are performed. Also, the processor 901 may record and read data on and from the memory 903. In addition, the processor 901 may perform functions of a protocol stack required in a communication standard. In this regard, the processor 901 may include at least one processor or microprocessor, or may be a part of a processor. A part of the transceiver 902 and the processor 901 may be referred to as a communication processor (CP). According to an embodiment of the present disclosure, the processor 901 may control a series of processes for the base station to operate according to embodiments of the present disclosure described above.

The transceiver 902 according to an embodiment of the present disclosure may perform functions for transmitting/receiving a signal via a radio channel. For example, the transceiver 902 may perform a conversion function between a baseband signal and a bit string, according to physical layer specifications of a system. For example, for data transmission, the transceiver 902 may generate complex symbols by encoding and modulating a transmit bit string. Also, during data reception, the transceiver 902 may reconstruct a reception bit string by demodulating and decoding the baseband signal. Also, the transceiver 902 may up-convert the baseband signal to an RF band signal and then transmits the RF band signal via an antenna, and down-convert the RF band signal received via the antenna to the baseband signal. For example, the transceiver 902 may include a transmit filter, a receive filter, an amplifier, a mixer, an oscillator, a DAC, and an ADC. Also, the transceiver 902 may include a plurality of transmission and reception paths. In addition, the transceiver 902 may include at least one antenna array including a plurality of antenna elements. In terms of hardware, the transceiver 902 may include a digital circuit and an analog circuit (for example, an RFIC). Here, the digital circuit and the analog circuit may be implemented in one package. The transceiver 902 may include a plurality of RF chains.

According to an embodiment of the present disclosure, the memory 903 may store a basic program, an application program, and data such as configuration information, for operations of the base station. The memory 903 may be configured in a volatile memory, a nonvolatile memory, or a combination of a volatile memory and a nonvolatile memory. Also, the memory 903 may provide the stored data upon request by the processor 901. The memory 903 may store at least one of information transmitted/received via the transceiver 902 and information generated via the processor 901.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in a device. The one or more programs may include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the present disclosure. Another storage device on the communication network may also be connected to the apparatus performing the embodiments of the present disclosure.

Meanwhile, specific embodiments have been described in the detailed description of the present disclosure, but various modifications may be possible without departing from the scope of the present disclosure. Therefore, the scope of the present disclosure should not be limited to the embodiments described above, but should be determined not only by the scope of the following claims, but also by the equivalents of the claims.

Block diagrams disclosed in the present disclosure may be construed to one of ordinary skill in the art that a circuit for implementing the principles of the present disclosure is conceptually represented. Similarly, it may be recognized by one of ordinary skill in the art that arbitrary flowcharts, flow diagrams, state transition diagrams, and pseudo-codes, and the like are substantially expressed in computer-readable media, and represent various processes executable by a computer or a processor regardless of whether the computer or the processor is explicitly shown. Accordingly, the above-described embodiments of the present disclosure may be written as a program executable on a computer, and may be implemented in a general-purpose digital computer operating the program using a computer-readable recording medium. Examples of the computer-readable medium include storage media such as magnetic storage media (for example, read-only memory (ROM), floppy disks, and hard disks), and optical readable media (for example, CD-ROM and DVD).

Functions of various elements shown in the drawings may be provided through the use of dedicated hardware as well as hardware that may execute software in relation to appropriate software. When provided by a processor, these functions may be provided by a single dedicated processor, a single shared processor, or a plurality of individual processors that may be partially shared. In addition, the term "processor" or "controller" should not be construed as exclusively referring to hardware that is capable of executing software, and may unlimitedly and implicitly include read-only memory (ROM), random-access memory (RAM), and non-volatile storage device for storing digital signal processor (DSP) hardware and software.

In claims of the present specification, an element represented as a unit for performing a particular function encompasses any method of performing the particular function, and such an element may include any type of software including a combination of circuit elements that perform the particular function or including firmware or microcode combined to a circuit suitable for executing software for performing the particular function.

In the present specification, the expression "an embodiment" of the principles of the present disclosure and various modifications of the expression indicate that specific features, structures, and characteristics are included in at least one embodiment of the principles of the present disclosure in relation to this embodiment. Thus, the expression "in an embodiment" and any other modifications throughout the present specification are not necessarily referring to the same embodiment.

In the present specification, the expression "at least one of" in "at least one of A and B" is used to encompass only a selection of a first option A, only a selection of a second option B, or a selection of both options A and B. As an additional example, "at least one of A, B, and C" may encompass only a selection of a first enumerated option A, only a selection of a second enumerated option B, only a selection of a third enumerated option C, only a selection of the first and second enumerated options A and B, only a selection of the second and third enumerated options B and C, only a selection of the first and third enumerated options A and C (삼일), and a selection of all three options A, B, and C. One of ordinary skill in the art may clearly expand the interpretation even when more items are enumerated.

Hereinabove, embodiments of the present disclosure have been described.

All embodiments and conditional examples disclosed in the present specification are described to help one of ordinary skill in the art to understand the principles and concept of the present disclosure, and one of ordinary skill in the art will understand that the present disclosure may be implemented in modified forms within the range that does not depart from the essential characteristics of the present disclosure. Therefore, the embodiments should be considered in descriptive sense only and not for purposes of limitation. The scope of the present disclosure is set forth in the claims rather than the foregoing description, and all differences within the scope equivalent thereto should be construed as being included in the present disclosure.

The invention claimed is:

1. An operation method of a terminal for measuring quality of a cell in a wireless communication system, the operation method comprising:
receiving a first plurality of beams on a first bandwidth part (BWP) in the cell and a second plurality of beams on a second BWP in the cell;
determining a first beam quality measurement value for the first BWP based on quality measurement values of the first plurality of beams received on the first BWP and a second beam quality measurement value for the second BWP, based on quality measurement values of the second plurality of beams received on the second BWP; and
determining a cell quality measurement value representing the quality of the cell, based on the first beam quality measurement value for the first BWP and the second beam quality measurement value for the second BWP.

2. The operation method of claim 1, wherein the determining of the cell quality measurement value comprises determining, as the cell quality measurement value, a higher value among the first beam quality measurement value and the second beam quality measurement value.

3. The operation method of claim 1, wherein the determining of the cell quality measurement value comprises determining, as the cell quality measurement value, an average of the first beam quality measurement value and the second beam quality measurement value.

4. The operation method of claim 1, wherein the determining of the cell quality measurement value comprises determining, as the cell quality measurement value, an average of all or some of values equal to or greater than a certain threshold value among the first beam quality measurement value and the second beam quality measurement value.

5. The operation method of claim 1, further comprising:
weight-filtering the cell quality measurement value; and
reporting, to a base station, the weight-filtered cell quality measurement value.

6. The operation method of claim 1, further comprising:
weight-filtering the first beam quality measurement value for the first BWP and the second beam quality measurement value for the second BWP;
determining at least one representative beam quality measurement value, based on the weight-filtered first beam quality measurement value and the weight-filtered second beam quality measurement value; and
reporting, to a base station, the at least one representative beam quality measurement value.

7. The operation method of claim 6, wherein the determining of the at least one representative beam quality measurement value comprises determining, as the at least one representative beam quality measurement value, a higher value among the weight-filtered first beam quality measurement value and the weight-filtered second beam quality measurement value.

8. The operation method of claim 6, wherein the determining of the at least one representative beam quality measurement value comprises determining, as the at least one representative beam quality measurement value, some or all of values equal to or greater than a certain threshold value among the weight-filtered first beam quality measurement value and the weight-filtered second beam quality measurement value.

9. A terminal for measuring quality of a cell in a wireless communication system, the terminal comprising:
a transceiver; and
at least one processor coupled to the transceiver and configured to:
receive a first plurality of beams on a first bandwidth part (BWP) in the cell and a second plurality of beams on a second BWP in the cell,
determine a first beam quality measurement value for the first BWP based on quality measurement values of the first plurality of beams received on the first BWP and a second beam quality measurement value for the second BWP based on quality measurement values of the second plurality of beams received on the second BWP, and
determine a cell quality measurement value representing the quality of the cell, based on the first beam quality measurement value for the first BWP and the second beam quality measurement value for the second BWP.

10. The terminal of claim 9, wherein the at least one processor is further configured to determine, as the cell quality measurement value, a higher value among the first beam quality measurement value and the second beam quality measurement value.

11. The terminal of claim 9, wherein the at least one processor is further configured to determine, as the cell quality measurement value, an average of the first beam quality measurement value and the second beam quality measurement value.

12. The terminal of claim 9, wherein the at least one processor is further configured to determine, as the cell quality measurement value, an average of all or some of values equal to or greater than a certain threshold value among the first beam quality measurement value and the second beam quality measurement value.

13. The terminal of claim 9, wherein the at least one processor is further configured to:
weight-filter the cell quality measurement value, and
report, to a base station, the weight-filtered cell quality measurement value.

14. The terminal of claim 9, wherein the at least one processor is further configured to:
weight-filter the first beam quality measurement value for the first BWP and the second beam quality measurement value for the second BWP,
determine at least one representative beam quality measurement value, based on the weight-filtered first beam quality measurement value and the weight-filtered second beam quality measurement value; and
report, to a base station, the at least one representative beam quality measurement value.

15. The terminal of claim 14, wherein the at least one processor is further configured to determine, as the at least one representative beam quality measurement value, a higher value among the weight-filtered first beam quality measurement value and the weight-filtered second beam quality measurement value.

16. The terminal of claim 14, wherein the at least one processor is further configured to determine, as the at least one representative beam quality measurement value, some or all of values equal to or greater than a certain threshold value among the weight-filtered first beam quality measurement value and the weight-filtered second beam quality measurement value.

* * * * *